US012594794B2

(12) United States Patent
Yoshie et al.

(10) Patent No.: US 12,594,794 B2
(45) Date of Patent: Apr. 7, 2026

(54) TIRE

(71) Applicant: The Yokohama Rubber Co., LTD.,
Kanagawa (JP)

(72) Inventors: Ryo Yoshie, Kanagawa (JP); Hiroshi Hata, Kanagawa (JP)

(73) Assignee: The Yokohama Rubber Co., LTD.,
Tokyo (JP)

( * ) Notice: Subject to any disclaimer, the term of this patent is extended or adjusted under 35 U.S.C. 154(b) by 20 days.

(21) Appl. No.: 18/711,472

(22) PCT Filed: Nov. 2, 2022

(86) PCT No.: PCT/JP2022/041065
§ 371 (c)(1),
(2) Date: May 17, 2024

(87) PCT Pub. No.: WO2023/095588
PCT Pub. Date: Jun. 1, 2023

(65) Prior Publication Data
US 2025/0001815 A1      Jan. 2, 2025

(30) Foreign Application Priority Data

Nov. 24, 2021      (JP) ................................. 2021-190523

(51) Int. Cl.
*B60C 19/08*            (2006.01)
(52) U.S. Cl.
CPC ............ *B60C 19/088* (2013.01); *B60C 19/08*
(2013.01); *B60C 19/084* (2013.01)

(58) Field of Classification Search
CPC ..... B60C 19/08; B60C 19/084; B60C 19/086;
B60C 19/088
See application file for complete search history.

(56) References Cited

U.S. PATENT DOCUMENTS

2020/0122510 A1 *    4/2020   Hata ....................... B60C 19/08

FOREIGN PATENT DOCUMENTS

| JP | S56131407 | A | * | 10/1981 | |
| JP | 2009039996 | A | * | 2/2009 | ............. B29D 30/60 |
| JP | 2015-123900 | A | | 7/2015 | |
| JP | 2016-78742 | A | | 5/2016 | |
| JP | 2016078742 | A | * | 5/2016 | |
| JP | 2016-203829 | A | | 12/2016 | |
| JP | 2017-1452 | A | | 1/2017 | |
| JP | 2017-43122 | A | | 3/2017 | |
| JP | 2019-051849 | A | | 4/2019 | |
| WO | 2019/244349 | A1 | | 12/2019 | |

* cited by examiner

*Primary Examiner* — Katelyn W Smith
*Assistant Examiner* — Thomas Frank Schneider
(74) *Attorney, Agent, or Firm* — Thorpe North & Western

(57) ABSTRACT

A pneumatic tire includes: a pair of bead portions; at least one carcass layer extending between the pair of bead portions; a belt layer disposed on an outer side of the carcass layer in a tire radial direction; and a tire inner surface rubber layer constituting a tire inner surface. The tire further includes a linear conductive portion extending continuously at least from one of the bead portions to the belt layer and disposed on the tire inner surface rubber layer. The linear conductive portion is at least partially exposed to a tire inner cavity side and has a volume resistivity of less than $1\times10^8$ Ω·cm.

15 Claims, 26 Drawing Sheets

50

51
52
51

TIRE CIRCUMFERENTIAL DIRECTION

| | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| LINEAR CONDUCTIVE PORTION LOCATION | CARCASS SURFACE | TIRE INNER SURFACE | TIRE INNER SURFACE | TIRE INNER SURFACE | TIRE INNER SURFACE | TIRE INNER SURFACE | TIRE INNER SURFACE | TIRE INNER SURFACE |
| VOLUME RESISTIVITY OF LINEAR CONDUCTIVE PORTION ($\Omega \cdot cm$) | $1 \times 10^7$ | $1 \times 10^7$ | $1 \times 10^7$ | $1 \times 10^7$ | $1 \times 10^7$ | $1 \times 10^7$ | $1 \times 10^7$ | $1 \times 10^7$ |
| La/Lbp | - | 0 | 0.2 | 1 | 1 | 1 | 1 | 1 |
| VOLUME RESISTIVITY OF BEAD PORTION RUBBER ($\Omega \cdot cm$) | $1 \times 10^9$ | $1 \times 10^9$ | $1 \times 10^9$ | $1 \times 10^9$ | $1 \times 10^7$ | $1 \times 10^7$ | $1 \times 10^7$ | $1 \times 10^7$ |
| Lbc/Lbg | - | 0 | 0 | 0 | 0.25 | 0.5 | 0.5 | 1 |
| f/t | - | 0 | 0 | 0 | 0 | 0 | 0.4 | 0.7 |
| L2/L1 | - | 1 | 1 | 1 | 1 | 1 | 1 | 1 |
| Lra/La | - | - | - | 1 | 1 | 1 | 1 | 1 |
| Lrb/Lb | - | - | - | - | - | - | - | 1 |
| Lrc/Lc | - | 1 | 1 | 1 | 1 | 1 | 1 | 1 |
| OVERLAPPING OF LINEAR CONDUCTIVE PORTIONS | NO | NO | NO | NO | NO | NO | NO | NO |
| TOTAL FINENESS (dtex) | - | 450 | 450 | 450 | 450 | 450 | 450 | 450 |
| ELONGATION RATIO (%) | - | 10 | 10 | 10 | 10 | 10 | 10 | 10 |
| PRESENCE OF COVER RUBBER LAYER | - | NO | NO | NO | NO | NO | NO | NO |
| TIRE ELECTRICAL RESISTANCE IN NEW CONDITION ($\Omega$) | $8.0 \times 10^7$ | $8.0 \times 10^7$ | $7.8 \times 10^7$ | $7.0 \times 10^7$ | $5.0 \times 10^7$ | $3.0 \times 10^7$ | $3.0 \times 10^7$ | $3.0 \times 10^7$ |
| TIRE ELECTRICAL RESISTANCE AFTER TRAVEL ($\Omega$) | $1.0 \times 10^9$ | $3.0 \times 10^8$ | $2.7 \times 10^8$ | $1.5 \times 10^8$ | $9.0 \times 10^7$ | $7.0 \times 10^7$ | $7.0 \times 10^7$ | $5.0 \times 10^8$ |

FIG. 25A

| | EXAMPLE 8 | EXAMPLE 9 | EXAMPLE 10 | EXAMPLE 11 | EXAMPLE 12 | EXAMPLE 13 | EXAMPLE 14 |
|---|---|---|---|---|---|---|---|
| LINEAR CONDUCTIVE PORTION LOCATION | TIRE INNER SURFACE | TIRE INNER SURFACE | TIRE INNER SURFACE | TIRE INNER SURFACE | TIRE INNER SURFACE | TIRE INNER SURFACE | TIRE INNER SURFACE |
| VOLUME RESISTIVITY OF LINEAR CONDUCTIVE PORTION ($\Omega \cdot cm$) | $1 \times 10^7$ | $1 \times 10^7$ | $1 \times 10^7$ | $1 \times 10^7$ | $1 \times 10^7$ | $1 \times 10^7$ | $1 \times 10^7$ |
| La/Lbp | 1 | 1 | 1 | 1 | 1 | 1 | 1 |
| VOLUME RESISTIVITY OF BEAD PORTION RUBBER ($\Omega \cdot cm$) | $1 \times 10^7$ | $1 \times 10^7$ | $1 \times 10^7$ | $1 \times 10^7$ | $1 \times 10^7$ | $1 \times 10^7$ | $1 \times 10^7$ |
| Lbc/Lbg | 0.5 | 0.5 | 0.5 | 0.5 | 0.5 | 0.5 | 0.5 |
| f/t | 0 | 0 | 0 | 0 | 0 | 0 | 0 |
| L2/L1 | 2 | 8 | 2 | 2 | 2 | 2 | 2 |
| Lra/La | 2 | 8 | 2.3 | 2.3 | 2.3 | 2.3 | 2.3 |
| Lrb/Lb | 2 | 8 | 4 | 4 | 4 | 4 | 4 |
| Lrc/Lc | 2 | 8 | 1.1 | 1.1 | 1.1 | 1.1 | 1.1 |
| OVERLAPPING OF LINEAR CONDUCTIVE PORTIONS | NO | NO | NO | YES | NO | NO | NO |
| TOTAL FINENESS (dtex) | 450 | 450 | 450 | 450 | 235 | 235 | 235 |
| ELONGATION RATIO (%) | 10 | 10 | 10 | 10 | 10 | 0.5 | 10 |
| PRESENCE OF COVER RUBBER LAYER | NO | NO | NO | NO | NO | NO | YES |
| TIRE ELECTRICAL RESISTANCE IN NEW CONDITION ($\Omega$) | $2.0 \times 10^7$ | $4.0 \times 10^7$ | $1.0 \times 10^7$ | $1.0 \times 10^7$ | $1.0 \times 10^7$ | $1.0 \times 10^7$ | $1.0 \times 10^7$ |
| TIRE ELECTRICAL RESISTANCE AFTER TRAVEL ($\Omega$) | $4.0 \times 10^7$ | $6.0 \times 10^7$ | $3.0 \times 10^7$ | $5.0 \times 10^7$ | $2.0 \times 10^7$ | $5.0 \times 10^7$ | $1.0 \times 10^7$ |

FIG. 25B

TIRE

TECHNICAL FIELD

The present technology relates to a tire.

BACKGROUND ART

Demand for a fuel-efficient tire has recently been increased due to environmental concerns. A used technique for making a tire fuel-efficient is a technique of suppressing tire rolling resistance by blending silica in a rubber used for a tread portion and a side portion of a tire. However, because silica has high insulating characteristics, the electrical resistance value of a tread rubber increases when silica content of the tread rubber increases, decreasing the electrostatic suppression performance of the tire. Decreasing the electrostatic suppression performance of the tire tends to accumulate static electricity generated during traveling of the vehicle, thus causing electromagnetic interference such as radio noise to tend to occur.

In response to this, some known pneumatic tires include a conductive member having a low electrical resistance value to increase electrostatic suppression performance to easily discharge static electricity generated in the vehicle during traveling of the vehicle to a road surface. For example, Japan Unexamined Patent Publication No. 2017-43122 A reduces electrical resistance of a tire by disposing a conductive thread having a low electrical resistance value on at least one surface of a carcass ply.

However, in a case where a conductive fiber, such as a conductive thread, is disposed along a surface of a carcass ply, the electrical resistance of a tire in new condition is low, but the conductive fiber tends to rub against the carcass ply due to deformation of the tire during traveling of the vehicle to which the tire is installed. In this case, the conductive fiber may be broken due to repeated rubbing against the carcass ply, and electricity may not flow through the conductive fiber. In a case where the electricity cannot flow through conductive fiber due to breakage of the conductive fiber, tire electrical resistance tends to increase, electrostatic suppression performance of the tire decreases, and thus there has been room for improvement from the viewpoint of maintenance of tire electrical resistance after travel.

SUMMARY

The present technology provides a tire that can maintain tire electrical resistance after travel.

A tire according to an embodiment of the present technology includes: a pair of bead portions; at least one carcass layer extending between the pair of bead portions; a belt layer disposed on an outer side of the carcass layer in a tire radial direction; and a tire inner surface rubber layer constituting a tire inner surface. The tire further includes a linear conductive portion extending continuously at least from one of the bead portions to the belt layer and disposed on the tire inner surface rubber layer.

The linear conductive portion is at least partially exposed to a tire inner cavity side and has a volume resistivity of less than $1 \times 10^8$ Ω·cm.

In the tire, the belt layer preferably includes one or more belt plies extending in a tire width direction, in drawing perpendicular lines from end portions on both sides in the tire width direction of a belt ply having a largest width in the tire width direction of the belt plies toward the tire inner surface, a periphery length between intersection points of the perpendicular lines and the tire inner surface is Lbp, a length in a periphery direction of a portion of the linear conductive portion positioned on an inner side in the tire radial direction of the belt layer is La, and the linear conductive portion preferably satisfies $0.01 \leq La/Lbp \leq 1$.

In the tire, a bead portion rubber in contact with a rim flange is preferably disposed in the bead portion, the bead portion rubber preferably has a volume resistivity of less than $1 \times 10^8$ Ω·cm, and the linear conductive portion preferably satisfies a relationship between a surface length Lbg of the bead portion rubber in the periphery direction and a length Lbc of a portion of the linear conductive portion overlapping the bead portion rubber of $0.01 \leq Lbc/Lbg \leq 1.00$.

In the tire, the linear conductive portion preferably extends from the tire inner surface side to at least a bead base beyond a bead toe of the bead portion.

In the tire, an embedded amount of the linear conductive portion from the tire inner surface side into the tire inner surface rubber layer is f, a thickness of the tire inner surface rubber layer is t, and the linear conductive portion preferably has the embedded amount f in a region having a largest embedded amount f into the tire inner surface rubber layer satisfying $f/t < 0.5$.

In the tire, the linear conductive portion preferably has a relationship between a length L1 of the linear conductive portion in the periphery direction and a total length L2 of the linear conductive portion satisfying $1 < L2/L1 < 5$.

In the tire, the linear conductive portion preferably satisfies a relationship between a distance Lc in the periphery direction of a portion of the linear conductive portion positioned between a position on an inner side in the tire radial direction of the belt layer and the bead portion and an actual length Lrc of a portion of the linear conductive portion positioned between a position on the inner side in the tire radial direction of the belt layer and the bead portion of $1.0 < Lrc/Lc < 3.0$, preferably satisfies a relationship between a distance La in the periphery direction of a portion of the linear conductive portion positioned on an inner side of the tire radial direction of the belt layer and a length Lra of a portion of the linear conductive portion positioned on an inner side in the tire radial direction of the belt layer of $Lrc/Lc < Lra/La < 8.0$, and preferably satisfies a relationship between a distance Lb in the periphery direction of a portion of the linear conductive portion positioned in the bead portion and a length Lrb of a portion of the linear conductive portion positioned in the bead portion of $Lrc/Lc < Lrb/Lb < 8.0$.

In the tire, a plurality of the linear conductive portions is preferably disposed, and the plurality of the linear conductive portions is preferably disposed without overlapping each other.

In the tire, the linear conductive portion is preferably made by intertwining a plurality of linear members including at least one conductive linear member having a volume resistivity of less than $1 \times 10^8$ Ω·cm.

In the tire, the linear conductive portion is preferably made by intertwining the conductive linear member and a non-conductive linear member having a volume resistivity of $1 \times 10^8$ Ω·cm or more.

In the tire, the conductive linear member is preferably a metal fiber, and the non-conductive linear member is preferably an organic fiber.

In the tire, the conductive linear member is preferably made by intertwining a plurality of carbon fibers.

In the tire, the conductive linear member is preferably a monofilament cord made of carbon fiber.

In the tire, the linear conductive portion preferably has a total fineness of 20 dtex or more and 1000 dtex or less.

In the tire, the linear conductive portion preferably has an elongation ratio of 1.0% or more and 70.0% or less.

Preferably, the tire further includes a cover rubber layer provided on the tire inner cavity side of the linear conductive portion and covering part of the linear conductive portion.

The tire according to an embodiment of the present technology has the effect of maintaining tire electrical resistance after travel.

BRIEF DESCRIPTION OF DRAWINGS

FIG. 25A is a table showing results of performance evaluation tests of pneumatic tires.

FIG. 25B is a table showing results of performance evaluation tests of pneumatic tires.

DETAILED DESCRIPTION

Tires according to embodiments of the present technology will be described in detail below with reference to the drawings. However, the technology is not limited to the embodiment. Constituents of the following embodiments include elements that can be substituted and easily conceived of by a person skilled in the art or that are essentially identical.

EMBODIMENTS

Pneumatic Tire

In the following description, a description will be given using a pneumatic tire 1 as an example of the tire according to the embodiments of the present technology. The pneumatic tire 1 as an example of the tire can be inflated with any gas including air and inert gas, such as nitrogen.

Hereinafter, the term "tire radial direction" refers to a direction orthogonal to a tire rotation axis (not illustrated) that is a rotation axis of the pneumatic tire 1, the term "inner side in a tire radial direction" refers to a side toward the tire rotation axis in the tire radial direction, and the term "outer side in the tire radial direction" refers to a side away from the tire rotation axis in the tire radial direction. The term "tire circumferential direction" refers to a circumferential direction with the tire rotation axis as a center axis. Additionally, the term "tire width direction" refers to a direction parallel with the tire rotation axis, the term "inner side in the tire width direction" refers to a side toward a tire equatorial plane (tire equator line) CL in the tire width direction, and the term "outer side in the tire width direction" refers to a side away from the tire equatorial plane CL in the tire width direction. The term "tire equatorial plane CL" refers to a plane that is orthogonal to the tire rotation axis and that runs through the center of the tire width of the pneumatic tire 1. The tire equatorial plane CL aligns, in a position in the tire width direction, with a center line in the tire width direction corresponding to a center position of the pneumatic tire 1 in the tire width direction. The tire width is the width in the tire width direction between portions located on the outermost sides in the tire width direction, or in other words, the distance between the portions that are the most distant from the tire equatorial plane CL in the tire width direction. "Tire equator line" refers to a line in the tire circumferential direction of the pneumatic tire 1 that lies on the tire equatorial plane CL. In the description below, "tire meridian section" refers to a cross-section of the tire taken along a plane that includes the tire rotation axis.

Figure 1:
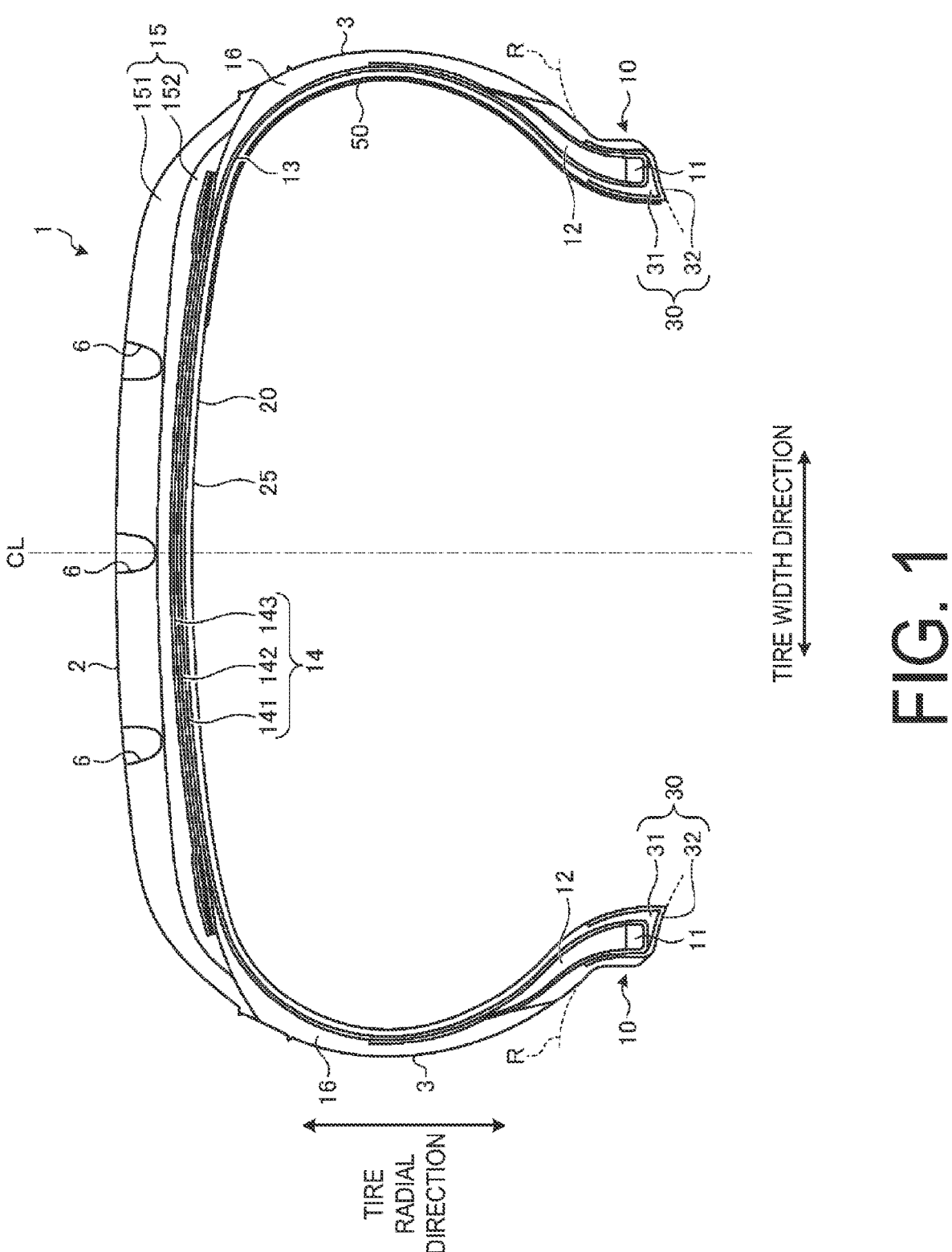
FIG. 1 is a cross-sectional view in a tire meridian direction illustrating a pneumatic tire according to an embodiment.

FIG. 1 is a cross-sectional view in a tire meridian direction illustrating a pneumatic tire 1 according to an embodiment. The same drawing illustrates a half region in a tire radial direction. The same drawing also illustrates a radial tire for a passenger vehicle as an example of a pneumatic tire.

A pneumatic tire 1 according to an embodiment has an annular structure having a tire rotation axis as a center, and includes a tread portion 2, a pair of sidewall portions 3, 3, a pair of bead portions 10, 10, a carcass layer 13, a belt layer 14, and a tire inner surface rubber layer 20 (see FIG. 1). Among these, the pair of sidewall portions 3, 3 and the pair of bead portions 10, 10 are each disposed on both sides of the tire equatorial plane CL in the tire width direction.

The pair of bead portions 10, 10 is positioned on the inner side in the tire radial direction of the pair of the sidewall portions 3, 3 and each has a bead core 11, a bead filler 12, and a bead portion rubber 30. In other words, a pair of the bead cores 11, 11, a pair of the bead fillers 12, 12, and a pair of the bead portion rubbers 30, 30 are disposed on both sides of the tire equatorial plane CL in the tire width direction. Furthermore, the bead portion rubber 30 includes a rim cushion rubber 31 and a chafer 32. Because of this, on both sides of the tire equatorial plane CL in the tire width direction, a pair of the rim cushion rubbers 31, 31 and a pair of chafers 32, 32 are disposed.

The pair of bead cores 11, 11 is annular members made of a plurality of bead wires bundled together, and constitutes the cores of the pair of bead portions 10, 10. The pair of bead fillers 12, 12 are disposed on the outer side in the tire radial direction of the pair of bead cores 11, 11 to reinforce the bead portions 10.

The carcass layer 13 has a single layer structure made of one carcass ply or a multilayer structure made of a plurality of carcass plies, and spans between the bead portions 10, 10 positioned on both sides in the tire width direction in a toroidal shape to form a framework of the tire. The carcass ply of the carcass layer 13 is made by coating, with coating rubber, and rolling a plurality of carcass cords made from steel or an organic fiber material such as aramid, nylon, polyester, or rayon. For this carcass ply of the carcass layer 13, a carcass angle as an absolute value is within a range of 80 deg or more and 95 deg or less, the carcass angle being defined as an inclination angle of the carcass cord in the extension direction with respect to the tire circumferential direction.

In the present embodiment, the carcass layer 13 has a single layer structure and continuously extends between the bead cores 11, 11 on both sides in the tire width direction. Both end portions of the carcass layer 13 are turned back toward outer sides in the tire width direction and fixed to wrap the bead cores 11 and the bead fillers 12. In other words, both end portion regions of the carcass layer 13 in a cross-sectional view in the tire meridian direction extend through from the inner side in the tire width direction to the inner side in the tire radial direction of the bead cores 11 and the bead fillers 12 and are turned back toward outer sides in the tire width direction.

The carcass ply of the carcass layer 13 preferably has a value of tan δ at 60° C. of the coating rubber of the carcass cord of 0.20 or less, and the coating rubber of the carcass cord preferably has a volume resistivity of $1×10^{8}$ Ω·cm or more. Accordingly, the tire rolling resistance decreases. The coating rubber having such a volume resistivity is made, for example, by using a compound with low exothermic properties and low carbon content. Furthermore, the coating rubber may contain no silica or may be reinforced by blending silica.

The value of tan δ at 60° C. is measured using a viscoelasticity spectrometer available from Toyo Seiki Seisaku-sho, Ltd. under the following conditions: 10% initial distortion, ±0.5% amplitude, and 20 Hz frequency.

Furthermore, the volume resistivity (volume specific resistance) is measured in accordance with the method specified in JIS (Japanese Industrial Standard) K 6271 "Rubber, vulcanized or thermoplastic—Determination of volume resistivity and surface resistivity". Typically, a member with a volume resistivity of less than $1×10^{8}$ Ω·cm or a surface resistivity of less than $1×10^{8}$ Ω·cm can be considered to have electrical conductivity sufficient to suppress a buildup of static electricity.

The pair of bead portion rubbers 30, 30 included in the pair of bead portions 10, 10 are disposed on an inner side in the tire radial direction of the turned back portions of the carcass layer 13 and the bead cores 11, 11 on both sides in the tire width direction. The bead portion rubber 30 is a portion in contact with a rim flange R included in a rim when the pneumatic tire 1 is mounted on the rim. The bead portion rubber 30 constitutes contact surfaces of the bead portions 10 for a rim flange R. The bead portion rubber 30 has a volume resistivity of less than $1×10^{8}$ Ω·cm. The volume resistivity of the bead portion rubber 30 is preferably $1×10^{7}$ Ω·cm or less.

The belt layer 14 has one or more belt plies extending in the tire width direction, and in the present embodiment, a plurality of belt plies 141 to 143 are layered. That is, in the present embodiment, the belt layer 14 is made by layering a pair of cross belts 141 and 142 and a belt cover 143 in the tire radial direction and is disposed on outer side in the tire radial direction of the carcass layer 13 to wind around the outer circumference of the carcass layer 13. The pair of cross belts 141, 142 is made by covering a plurality of belt cords made from steel or an organic fiber material with coating rubber and performing a rolling process on the belt cords, and a belt angle defined as an inclination angle in extension directions of the belt cords with respect to the tire circumferential direction is within a range of 20 deg or more and 65 deg or less as an absolute value. The pair of cross belts 141, 142 is configured as a so-called crossply structure, by being layered with the extension directions of the belt cords intersecting with one another, with their belt angles having opposite signs. Thus, inclination directions of the belt cords of the pair of cross belts 141, 142, toward the tire width direction with respect to the tire circumferential direction, are opposite to each other. The belt cover 143 is made by performing a rolling process on coating-rubber-covered cords made of steel or an organic fiber material. The belt cover 143 has a belt angle, as an absolute value, within a range of 0 deg or more and 10 deg or less. The belt cover 143 is disposed layered on an outer side of the cross belts 141, 142 in the tire radial direction.

The tread portion 2 includes a tread rubber 15 that is a rubber composition and is disposed on an outer side of the carcass layer 13 and the belt layer 14 in the tire radial direction and is exposed on the outermost side of the pneumatic tire 1 in the tire radial direction. Because of this, the outer circumferential surface of the tread portion 2 constitutes part of contour of the pneumatic tire 1. On the tread portion 2, circumferential main grooves 6 extending in the tire circumferential direction and grooves such as lug grooves (not illustrated) are formed. The tread rubber 15 constituting the tread portion 2 includes a cap tread 151 and an undertread 152.

The cap tread 151 is a rubber member that is positioned on the outermost side of the tread portion 2 in the tire radial direction and that constitutes the tire ground contact surface and may have a single layer structure (see FIG. 1) or a multilayer structure (not illustrated). The cap tread 151 preferably has a value of tan δ at 60° C. of 0.25 or less. In addition, the cap tread 151 preferably has a volume resistivity of 1×10^8 Ω·cm or greater, more preferably of 1×10^10 Ω·cm or greater, and even more preferably of 1×10^12 Ω·cm or greater. Accordingly, the rolling resistance of the pneumatic tire 1 is reduced. The cap tread 151 having such a volume resistivity is made using a compound with low exothermic properties and low carbon content, or alternatively by increasing the silica content to improve the volume resistivity.

The undertread 152 is a member layered inward of the cap tread 151 in the tire radial direction. The volume resistivity of the undertread 152 is preferably less than a volume resistivity of the cap tread 151.

The pair of the sidewall portions 3, 3 each includes a sidewall rubber 16. The pair of sidewall rubbers 16, 16 included in the pair of the sidewall portions 3, 3 are each disposed outward of the carcass layer 13 in the tire width direction. The sidewall rubber 16 preferably has a value of tan δ at 60° C. of 0.20 or less. In addition, the sidewall rubber 16 preferably has a volume resistivity of 1×10^8 Ω·cm or more, more preferably of 1×10^10 Ω·cm or more, and even more preferably of 1×10^12 Ω·cm or more. Accordingly, the rolling resistance of the pneumatic tire 1 is reduced. The sidewall rubber 16 having such a volume resistivity is made using a compound with low exothermic properties and low carbon content, or alternatively by increasing the silica content to improve the volume resistivity.

The upper limit value for the volume resistivity of the cap tread 151, the lower limit value for the volume resistivity of the undertread 152, the upper limit value for the volume resistivity of the sidewall rubber 16, and the lower limit value for the volume resistivity of the rim cushion rubber 17 are not particularly limited, but are subject to physical restrictions specific to being a rubber member.

The tire inner surface rubber layer 20 constitutes the tire inner surface 25 that is a surface on the inner side of the pneumatic tire 1, and the tire inner surface rubber layer 20 is facing the tire inner cavity that is a space inside of the pneumatic tire 1. The tire inner surface rubber layer 20 constituting the tire inner surface 25 is disposed on the tire inner cavity side with respect to the carcass layer 13 and covers the carcass layer 13 from the tire inner cavity side. [Electrostatic Suppressing Structure]

Figure 2:
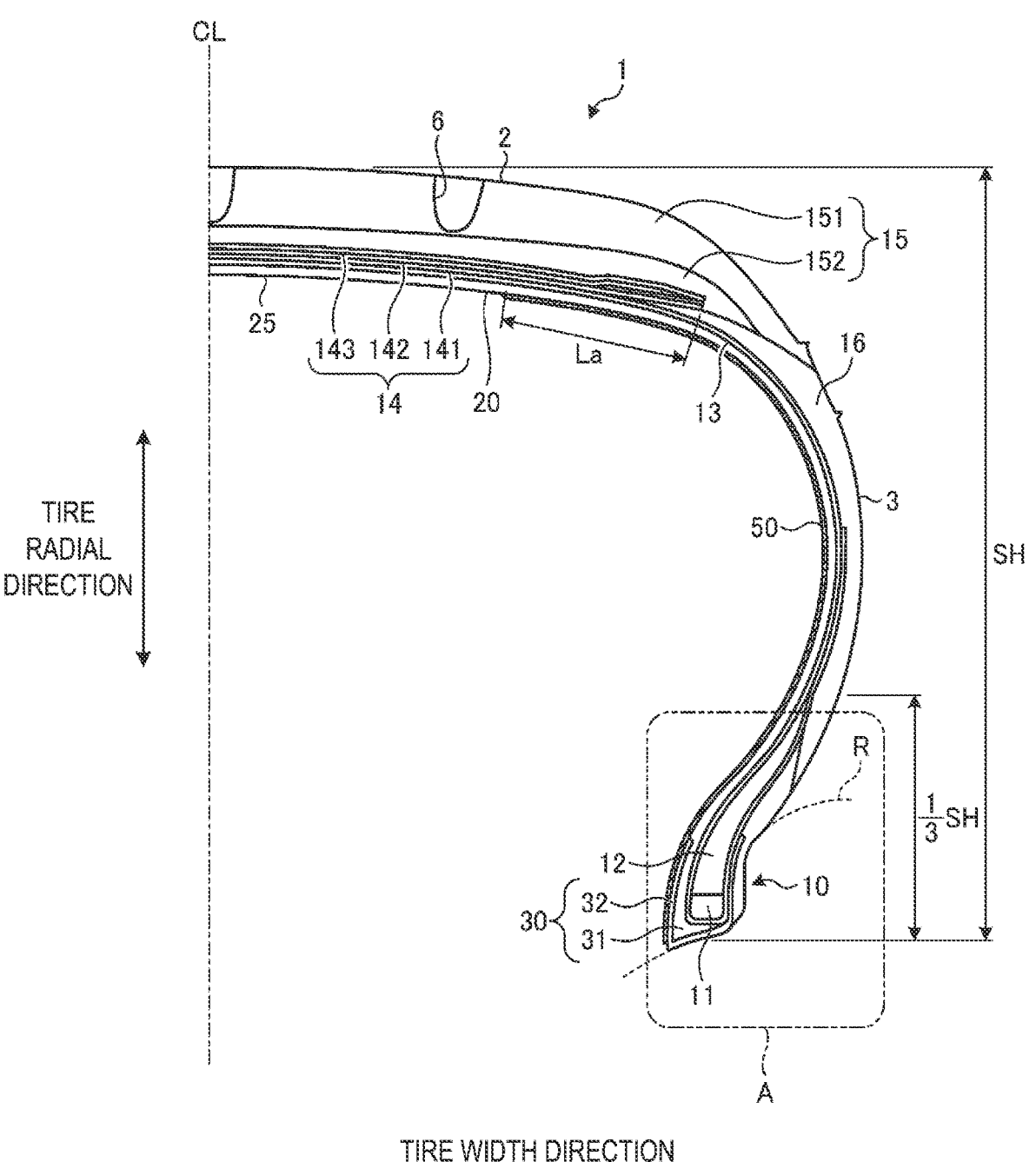
FIG. 2 is a detailed view illustrating a region in one side from a tire equatorial plane in a tire width direction in FIG. 1.

FIG. 2 is a detailed view illustrating a region in one side from a tire equatorial plane CL in tire width direction in FIG. 1. The pneumatic tire 1 according to the present embodiment employs an electrostatic suppressing structure to discharge static electricity generated in the vehicle during traveling of the vehicle, to the road surface. As the electrostatic suppressing structure, a linear conductive portion 50 is used. The linear conductive portion 50 is a linear member having a volume resistivity of less than 1×10^8 Ω·cm, extends continuously at least from the bead portion 10 to the belt layer 14, and is disposed on the tire inner surface rubber layer 20. The linear conductive portion 50 disposed on the tire inner surface rubber layer 20 is disposed on the tire inner surface 25 of the tire inner surface rubber layer 20 and exposed to the tire inner cavity side. That is, the linear conductive portion 50 is continuous from a position on the inner side of the bead portion 10 in the tire width direction to a position on the inner side of the belt layer 14 in the tire radial direction and disposed on the tire inner surface 25 of the tire inner surface rubber layer 20. In the present embodiment, among the bead portions 10 disposed on both sides of the tire equatorial plane CL in the tire width direction, the linear conductive portion 50 is disposed continuously from a position on the inner side of one of the bead portions 10 in the tire width direction to a position on the inner side of the belt layer 14 in the tire radial direction.

In the present embodiment, "bead portion 10" refers to the region from the rim diameter measurement point to a position at one third of the tire cross-sectional height SH. "Tire cross-sectional height SH" is referred to as a half of the difference between the tire outer diameter and the rim diameter measured when the pneumatic tire 1 is mounted on a specified rim, inflated to the specified internal pressure, and in an unloaded state.

Here, "specified rim" refers to an "applicable rim" defined by the Japan Automobile Tyre Manufacturers Association (JATMA), a "Design Rim" defined by the Tire and Rim Association (TRA), or a "Measuring Rim" defined by the European Tyre and Rim Technical Organisation (ETRTO). Additionally, the specified internal pressure refers to a "maximum air pressure" specified by JATMA, the maximum value in "TIRE LOAD LIMITS AT VARIOUS COLD INFLATION PRESSURES" specified by TRA, or "INFLATION PRESSURES" specified by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a tire for a passenger vehicle, the specified internal pressure is an air pressure of 180 kPa, and the specified load is 88% of the maximum load capacity.

The linear conductive portion 50 is disposed along the tire inner surface 25 on the inner side of the tire inner surface rubber layer 20 in the tire radial direction at the position on the inner side of the belt layer 14 in the tire radial direction, and the end portion of the linear conductive portion 50 on the outer side of the tire direction is positioned at a portion on the inner side of the belt layer 14 in the tire radial direction. Accordingly, the linear conductive portion 50 is disposed overlapping the belt layer 14 in the tire radial direction at a position on the inner side of the belt layer 14 in the tire radial direction.

The linear conductive portion 50 is disposed along the tire inner surface 25 on the inner side of the tire inner surface rubber layer 20 or the bead portion rubber 30 in the tire width direction at a position on the sidewall portion 3 or the bead portion 10. The end portion of the linear conductive portion 50 disposed in this manner on the inner side of the tire direction is positioned on the inner side of the bead portion 10 in the tire width direction. The portion of the linear conductive portion 50 positioned in the bead portion 10 is disposed overlapping the bead portion rubber 30 in the tire width direction and is in contact with the bead portion rubber 30. Accordingly, a conductive path is ensured from the rim fitting surface to the linear conductive portion 50 via the bead portion rubber 30, and a conductive path from the position in the bead portion 10 to the position in the belt layer 14 is ensured.

The linear conductive portion 50 disposed as described above extends in a direction close to the tire width direction at a position overlapping the belt layer 14 in the tire radial direction and extends in a direction close to the tire radial direction at a position in the sidewall portion 3 or the bead portion 10.

Figure 3:
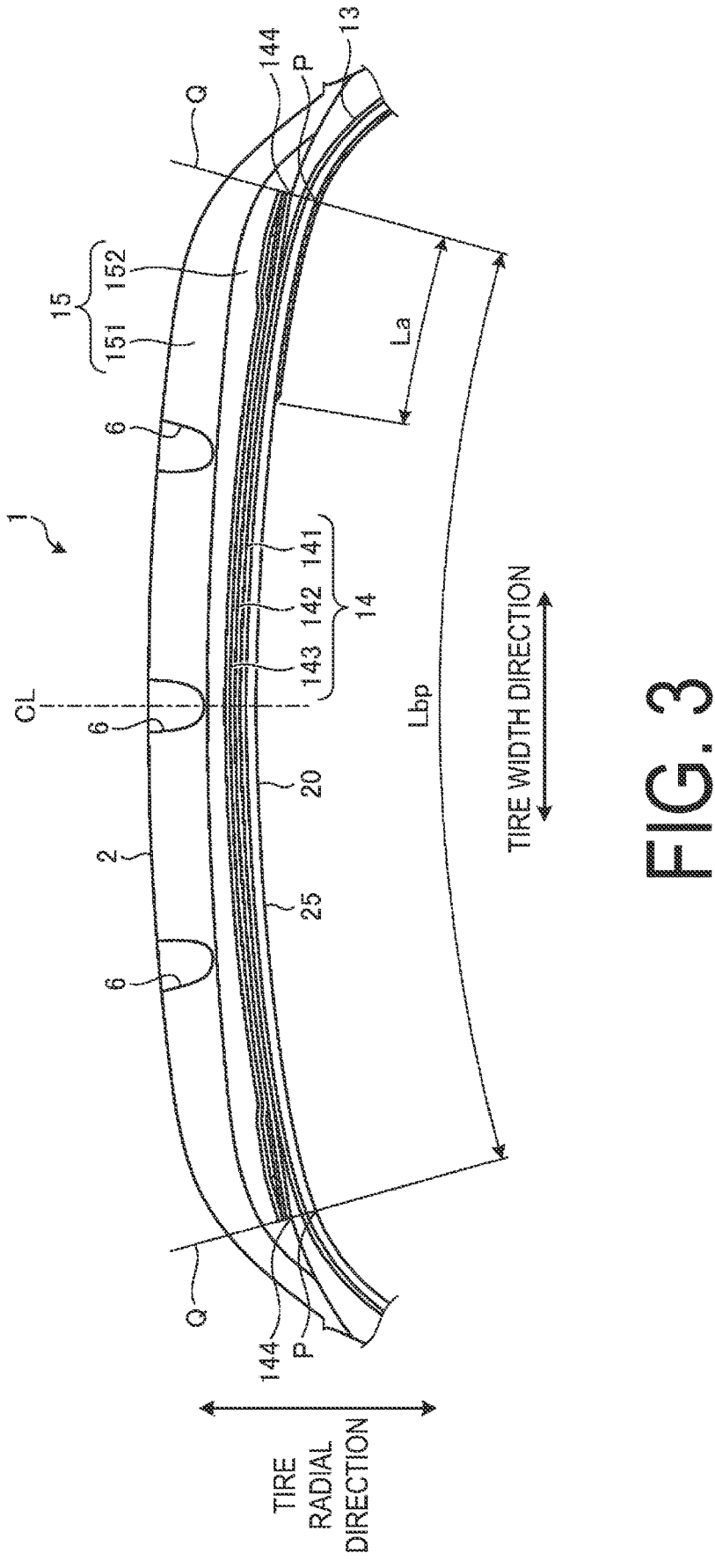
FIG. 3 is an explanatory diagram for a lap width of a linear conductive portion with respect to a belt layer.

FIG. 3 is an explanatory diagram for a lap width La of a linear conductive portion 50 with respect to a belt layer 14. The linear conductive portion 50 has a relationship of a width Lbp of the belt layer 14 in the periphery direction and a width in the periphery direction of the portion of the linear conductive portion 50 overlapping the belt layer 14 in the tire radial direction, i.e., a lap width La of the linear conductive portion 50 with respect to the belt layer 14, satisfying $0.01 \leq La/Lbp \leq 1$. The lap width La of the linear conductive portion 50 in this case is a distance La in the periphery direction of the portion of the linear conductive portion 50 positioned on the inner side of the belt layer 14 in the tire radial direction. In the present embodiment, the periphery direction refers to a direction along a surface of the pneumatic tire 1 at positions having an identical position in the tire circumferential direction.

The width Lbp of the belt layer 14 in the periphery direction in this case is a periphery length between intersection points P of perpendicular lines Q and a tire inner surface 25 when the perpendicular lines Q are drawn from end portions 144 on both sides in the tire width direction of the belt ply having a largest width in the tire width direction toward the tire inner surface 25. The lap width La of the linear conductive portion 50 with respect to the belt layer 14 is a length in the periphery direction of the portion of the linear conductive portion 50 positioned on the inner side of the belt layer 14 in the tire radial direction, specifically a length in the periphery direction of the portion of the linear conductive portion 50 positioned between the intersection points P.

Figure 4:
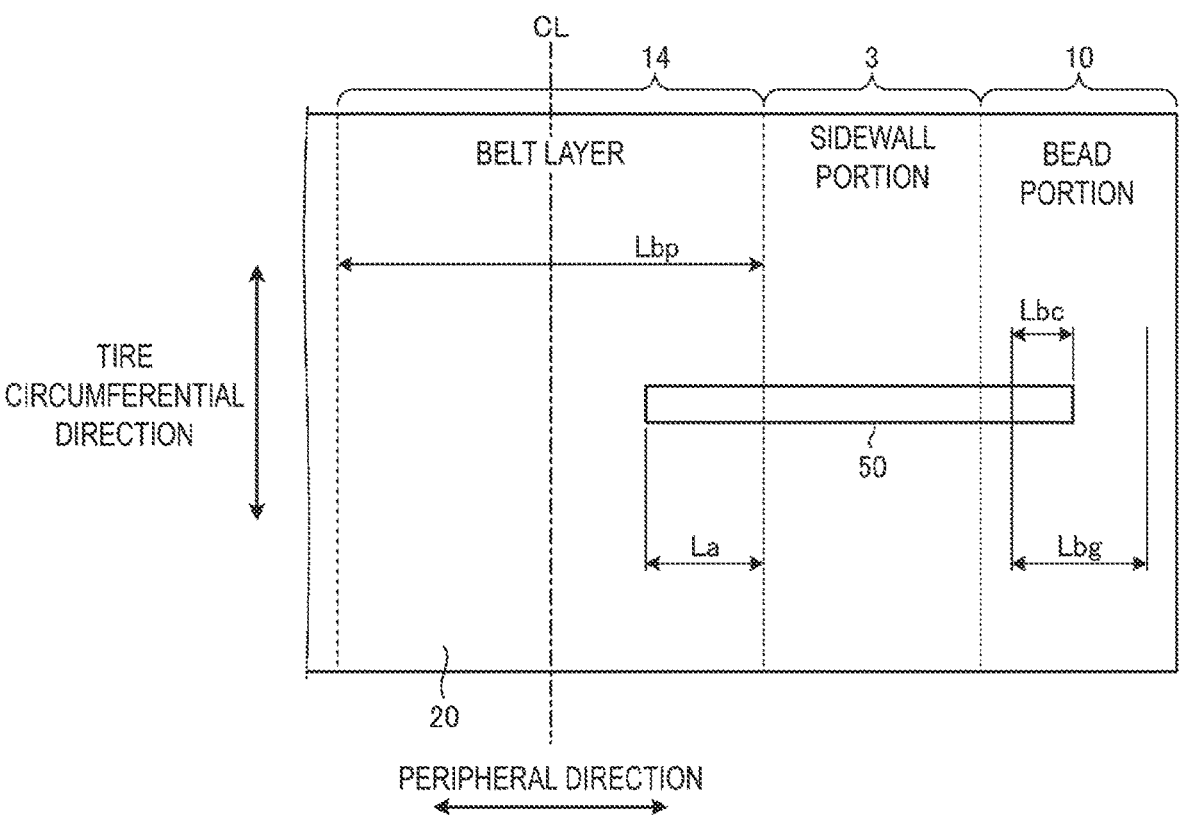
FIG. 4 is an explanatory diagram for a length of a portion of a linear conductive portion disposed at positions in a belt layer and a bead portion.

FIG. 4 is an explanatory diagram for a length of a portion of a linear conductive portion 50 disposed at positions in a belt layer 14 and a bead portion 10. FIG. 4 is a developed view in which a pneumatic tire 1 is extended and illustrated by setting the periphery direction as a lateral direction of the drawing. Because the belt layer 14 is disposed over the tire equatorial plane CL to both sides of the tire equatorial plane CL in the tire width direction, the width Lbp of the belt layer in the periphery direction is a width over the tire equatorial plane CL as illustrated in FIG. 4. The linear conductive portion 50 extends continuously from the belt layer 14 to the bead portion 10, and the lap width La of the linear conductive portion 50 with respect to the belt layer 14 is a length of a portion of the linear conductive portion 50 positioned in a range of the width Lbp of the belt layer 14 in the periphery direction as illustrated in FIG. 4.

Figure 5:
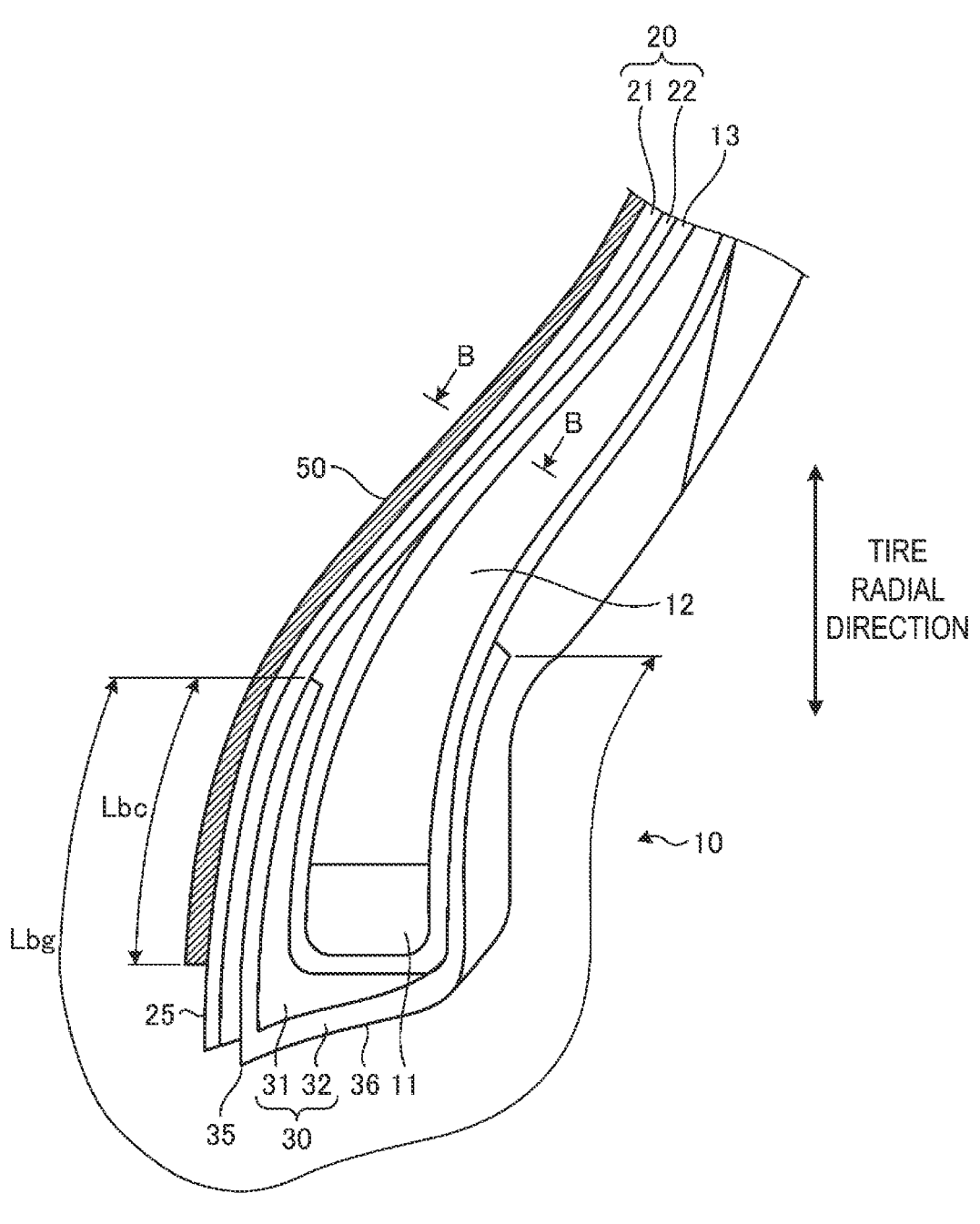
FIG. 5 is a detailed view of a portion A of FIG. 2.

FIG. 5 is a detailed view of a portion A of FIG. 2. The tire inner surface rubber layer 20 is configured by layering an innerliner 21 constituting the tire inner surface 25 and a tie rubber 22 disposed on a side where the carcass layer 13 is positioned with respect to the innerliner 21. Among these, the innerliner 21 is an air penetration preventing layer disposed covering the carcass layer 13, suppresses oxidation caused by exposure of the carcass layer 13, and prevents leaking of the air inflated in the tire. Additionally, the innerliner 21 is made of, for example, a rubber composition containing butyl rubber as a main component, a thermoplastic resin, and a thermoplastic elastomer composition containing an elastomer component blended in a thermoplastic resin. In particular, by using a thermoplastic resin or a thermoplastic elastomer composition to form the innerliner 21, the innerliner 21 can be made thinner than that in a configuration in which butyl rubber is used for the innerliner 21. Thus, the tire weight can be greatly reduced.

The air permeability coefficient of the innerliner 21 is typically preferably $100 \times 10^{\wedge}12$ [cc·cm/cm$^{\wedge}2$ sec·cmHg] or less, and more preferably $50 \times 10^{\wedge}12$ [cc·cm/cm$^{\wedge}2$·sec·cmHg] or less, in a case where the air permeability coefficient is measured in accordance with JIS K 7126-1 at a temperature of 30° C. In addition, the innerliner 21 has a volume resistivity of preferably $1 \times 10^{\wedge}8$ Ω·cm or more, and typically preferably $1 \times 10^{\wedge}9$ Ω·cm or more.

Examples of the rubber composition containing butyl rubber as a main component that can be used include butyl rubber (IIR) and butyl-based rubber. Butyl-based rubber is preferably a halogenated butyl rubber such as chlorinated butyl rubber (Cl-IIR) and brominated butyl rubber (Br-IIR).

Examples of a thermoplastic resin that can be used include polyamide resins (nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6, nylon 6T, nylon 9T, nylon 6/6T copolymers, nylon 66/PP copolymers, and nylon 66/PPS copolymers); polyester resins (aromatic polyesters such as polybutylene terephthalate (PBT), polyethylene terephthalate (PET), polyethylene isophthalate (PEI), polybutylene terephthalate/tetramethylene glycol copolymers, PET/PEI copolymers, polyarylate (PAR), polybutylene naphthalate (PBN), liquid crystal polyester, and polyoxyalkylene diimidic diacid/polybutylene terephthalate copolymers); polynitrile resins (poly acrylonitrile (PAN), polymethacrylonitrile, acrylonitrile/styrene copolymers (AS), (meth)acrylonitrile/styrene copolymers, and (meth)acrylonitrile/styrene/butadiene copolymers); poly (meth)acrylate resins (polymethylmethacrylate (PMMA), polyethylmethacrylate, ethylene ethyl acrylate copolymers (EEA), ethylene acrylate copolymers (EAA), and ethylene methyl acrylate resins (EMA)); polyvinyl resins (vinyl acetate (EVA), polyvinylalcohol (PVA), vinyl alcohol/ethylene copolymers (EVOH), polyvinylidene chloride (PVDC), polyvinyl chloride (PVC), vinyl chloride/vinylidene chloride copolymers, and vinylidene chloride/methylacrylate copolymers); cellulose resins (cellulose acetate and cellulose acetate butyrate); fluorine resins (polyvinylidene fluoride (PVDF), polyvinyl fluoride (PVF), polychlorofluoroethylene (PCTFE), and tetrafluoroethylene/ethylene copolymers (ETFE)); imide resins (aromatic polyimide (PI)); and the like.

Examples of elastomer that can be used include diene rubber and hydrogenates thereof (NR, IR, epoxidized natural rubber, SBR, BR (high-cis BR and low-cis BR), NBR, hydrogenated NBR, and hydrogenated SBR); olefin rubber (ethylene propylene rubber (EPDM, EPM), maleated ethylene propylene rubber (M-EPM); butyl rubber (IIR); isobutylene and aromatic vinyl or diene monomer copolymers; acrylic rubber (ACM); ionomer; halogen-containing rubber (Br-IIR, Cl-IIR brominated copolymer of isobutylene/paramethyl styrene (Br-IPMS), chloroprene rubber (CR), hydrin rubber (CHC, CHR), chlorosulfonated polyethylene (CSM), chlorinated polyethylene (CM), and maleated chlorinated polyethylene (M-CM)); silicone rubber (methyl vinyl silicone rubber, di-methyl silicone rubber, and methyl phenyl vinyl silicone rubber); sulfur-containing rubber (polysulfide rubber); fluororubber (vinylidene fluoride rubber, fluorine-containing vinyl ether rubber, tetrafluoroethylene-propylene rubber, fluorine-containing silicone rubber, and fluorine-containing phosphazene rubber); and thermoplastic elastomer (styrene elastomer, olefin elastomer, polyester elastomer, urethane elastomer, and polyamide elastomer).

Furthermore, the tie rubber 22 disposed between the innerliner 21 and the carcass layer 13 is a layer to suppress penetration of the carcass cord of the carcass layer 13 into the innerliner 21 when an unvulcanized pneumatic tire 1 is inflated during tire manufacture. The tie rubber 22 contributes to air permeation preventive properties and steering stability on dry road surfaces for a pneumatic tire 1 after manufacture.

The bead portion rubber 30 disposed in the bead portion 10 is disposed extending on the outer side in the tire width direction of the bead core 11 through the inner side in the tire width direction of the bead core 11 in the bead portion 10 to the inner side in the tire radial direction of the bead core 11. The tire inner surface rubber layer 20 is positioned on the inner side of the bead portion rubber 30 in the tire width direction at a position of the bead portion 10 and is positioned in the vicinity of the bead toe 35 that is an end portion on the inner side in the tire width direction of the bead base 36 that is an inner circumferential surface of the bead portion 10. The linear conductive portion 50 disposed on the tire inner surface rubber layer 20 is positioned in the vicinity of the bead toe 35 on the outer side in the tire radial direction of the bead toe 35 at a position of the bead portion 10. Thus, the linear conductive portion 50 and the tire inner surface rubber layer 20 overlap with the bead portion rubber 30 at a position in the bead portion 10.

The linear conductive portion 50 disposed overlapping the bead portion rubber 30 satisfies the relationship of the surface length Lbg of the bead portion rubber 30 in the periphery direction and the length Lbc of a portion of the linear conductive portion 50 overlapping the bead portion rubber 30 of $0.01 \leq Lbc/Lbg \leq 1.00$. The bead portion rubber 30 includes the rim cushion rubber 31 and the chafer 32; however, in the present embodiment, the surface length Lbg of the bead portion rubber 30 is the surface length Lbg of the chafer 32 included in the bead portion rubber 30 in the periphery direction.

The length Lbc of the portion of the linear conductive portion 50 overlapping the bead portion rubber 30 is a length in the periphery direction of a portion of the linear conductive portion 50 overlapping the chafer 32 included in the bead portion rubber 30. In other words, the length Lbc of the portion of the linear conductive portion 50 overlapping the bead portion rubber 30 is a length of a portion of the linear conductive portion 50 positioned in a range of the surface length Lbg in the periphery direction of the chafer 32 included in the bead portion rubber 30 (see FIG. 4).

The surface length Lbg of the bead portion rubber 30 may be a length of the rim cushion rubber 31 included in the bead portion rubber 30 in the periphery direction or may be a length of the entire bead portion rubber 30, which includes the rim cushion rubber 31 and the chafer 32 included in the bead portion rubber 30, in the periphery direction. That is, the length Lbc of a portion of the linear conductive portion 50 overlapping the bead portion rubber 30 may be a length of the portion overlapping the rim cushion rubber 31 included in the bead portion rubber 30 in the periphery direction or may be a length in the periphery direction of the portion overlapping the entire bead portion rubber 30 including the rim cushion rubber 31 and the chafer 32. As the surface length Lbg of the bead portion rubber 30, a length of a member having a volume resistivity of less than $1 \times 10^{8}$ $\Omega \cdot cm$ in the bead portion rubber 30 in the periphery direction is preferably employed.

Figure 6:
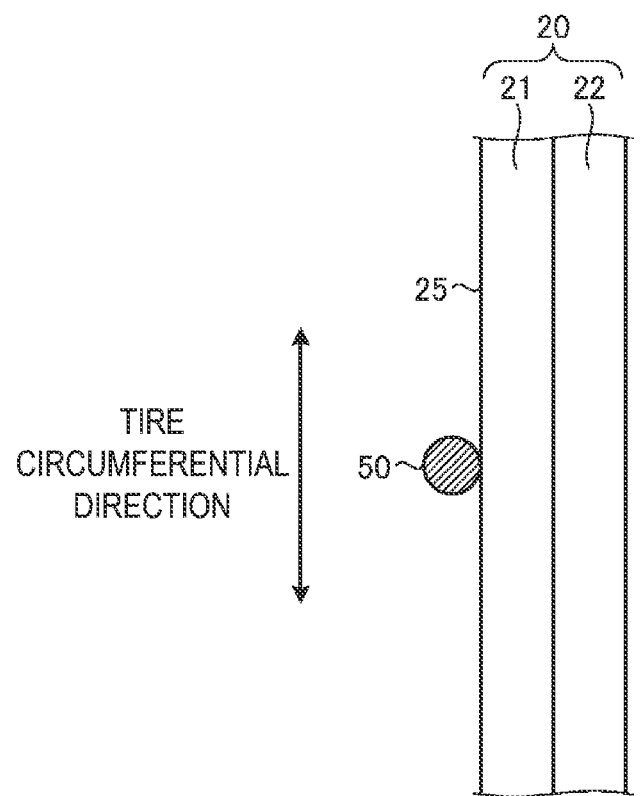
FIG. 6 is a detailed view of a tire inner surface rubber layer and a linear conductive portion in a B-B cross-sectional direction of FIG. 5.

FIG. 6 is a detailed view of a tire inner surface rubber layer 20 and a linear conductive portion 50 in a B-B cross-sectional direction of FIG. 5. The linear conductive portion 50 is disposed on the tire inner surface 25 of the tire inner surface rubber layer 20 and, for example, the linear conductive portion 50 is disposed on the tire inner surface 25 side of the tire inner surface rubber layer 20 by using an adhesive. In other words, the linear conductive portion 50 is disposed on the tire inner surface 25 of the innerliner 21 in the tire inner surface rubber layer 20 in which the innerliner 21 and the tie rubber 22 are layered.

Figure 7:
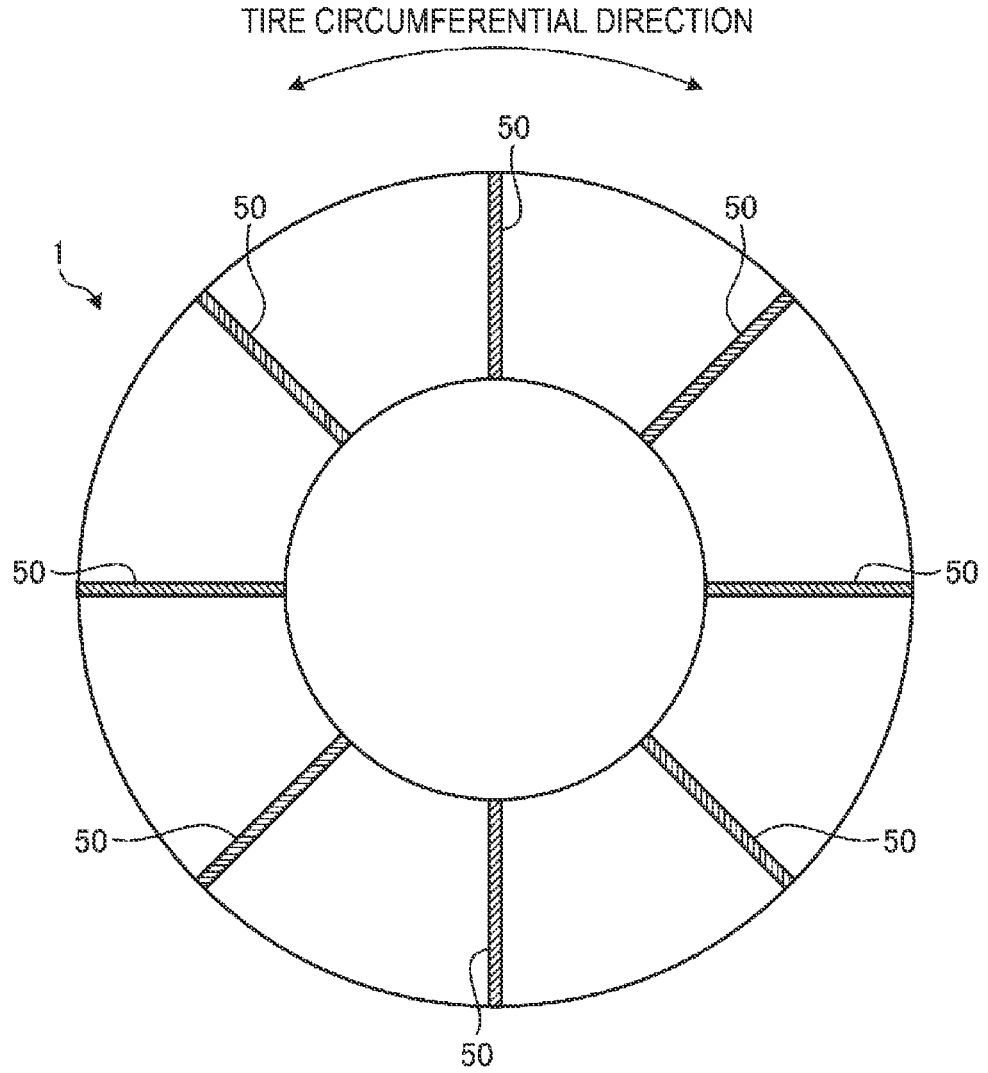
FIG. 7 is a schematic diagram illustrating a form of arrangement of linear conductive portions in a case where a pneumatic tire is seen from a direction of a tire rotation axis.

FIG. 7 is a schematic diagram illustrating a form of arrangement of linear conductive portions 50 in a case where a pneumatic tire 1 is seen from a direction of a tire rotation axis. In the pneumatic tire 1, a plurality of linear conductive portions 50 is disposed, and the plurality of the linear conductive portions 50 is disposed without overlapping each other. The plurality of the linear conductive portions 50 is, for example, disposed radially at predetermined intervals in the tire circumferential direction as illustrated in FIG. 7.

Figure 8:
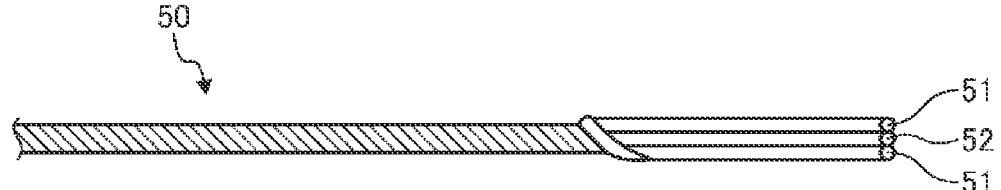
FIG. 8 is an explanatory diagram for a single linear conductive portion.

FIG. 8 is an explanatory diagram for a single linear conductive portion 50. FIG. 8 illustrates the stranded wire structure of the linear conductive portion 50. The linear conductive portion 50 has a linear structure including the conductive linear member 51. The linear conductive portion 50 preferably has a stranded wire structure made by intertwining a plurality of linear members including at least one conductive linear member 51 having a volume resistivity of less than $1 \times 10^{8}$ $\Omega \cdot cm$. The linear conductive portion 50 may be a monofilament cord made of a conductive material (not illustrated).

The conductive linear member 51 is a linear member made of conductive material linearly formed. The conductive linear member 51 thus means a monofilament, a strand, or a cord made of conductive material. Accordingly, for example, the conductive linear member 51 may correspond to a monofilament cord made of a metal or carbon fiber, a metal fiber of fiberized metal such as stainless steel, and the like. Alternatively, the conductive linear member 51 may have a surface of a strand or cord that has been coated with a conductive material.

Examples of the stranded wire structure of the linear conductive portion 50 (see FIG. 8) include: (1) a structure made by intertwining a plurality of carbon fibers; and (2) a structure made by intertwining a conductive linear member 51 having a volume resistivity of less than $1 \times 10^{8}$ $\Omega \cdot cm$ and a non-conductive linear member 52 having a volume resistivity of $1 \times 10^{8}$ $\Omega \cdot cm$ or more. The stranded wire structure of the linear members is not limited to any particular structure, and any structure can be applied.

As the non-conductive linear member 52 of above-mentioned (2), for example, polyester fiber or nylon fiber can be used. In particular, the linear conductive portion 50 is preferably a blended yarn of the conductive linear member 51 made by intertwining a metal fiber and the non-conductive linear member 52 made of an organic fiber, such as polyester fiber.

The linear conductive portion 50 preferably has a total fineness within a range of 20 dtex or more and 1000 dtex or less, and more preferably within a range of 150 dtex or more and 350 dtex or less. Setting this lower limit of the total fineness to a value within the range described above ensures that the linear conductive portion 50 is prevented from breaking when the tire is manufactured. In addition, setting this upper limit of total fineness to a value within the range described above ensures that the linear conductive portion 50 is prevented from breaking during rolling of the tire.

The total fineness is measured in accordance with JIS L 1017 (8.3 Test methods for chemical fiber tire cords—Fineness based on corrected weight).

The elongation ratio of the linear conductive portion 50, that is, the elongation of the linear conductive portion 50, is preferably within a range of 1.0% or more and 70.0% or less. Setting the elongation to 1.0% or more ensures that the linear conductive portion 50 is prevented from breakage when the tire is manufactured. Setting the elongation to 70.0% or less ensures that the linear conductive portion 50 is prevented from breakage during rolling of the tire.

The elongation ratio of the linear members is measured in accordance with JIS L 1017 (8.5 Test methods for chemical fiber tire cords—Tensile strength and elongation ratio).

The linear conductive portion 50 of the present embodiment is yarn, and this linear conductive portion 50 is disposed between the carcass layer 13 and the adjacent member. As illustrated in FIG. 8, the linear conductive portion 50 has a stranded wire structure made by intertwining the conductive linear member 51 having a volume resistivity of less than $1\times10^{\wedge}8$ $\Omega$·cm and the non-conductive linear member 52 having a volume resistivity of $1\times10^{\wedge}8$ $\Omega$·cm or more.

In the pneumatic tire 1 according to the present embodiment, the electrostatic suppressing structure is configured as described above, and thus a path from the rim R through the bead portion rubber 30 and the linear conductive portion 50 to the belt layer 14 can be used as a conductive path to discharge static electricity in a vehicle to a road surface.

The bead portion rubber 30, the coating rubber of the carcass layer 13, and the coating rubber of the belt layer 14 constitute the conductive path from the rim R to the belt layer 14. Thus, the volume resistivities of these pieces of rubber are preferably set low. Accordingly, efficiency in the electrical conductivity from the rim R to the belt layer 14 is improved.

Functions and Effects

When a vehicle on which the pneumatic tire 1 according to the embodiment is mounted is driven, the pneumatic tire 1 rotates while, among surfaces of the tread portion 2 of the pneumatic tire 1, the portion located below and facing the road surface comes in contact with the road surface. The pneumatic tire 1 can cause a friction force between the road surface and the pneumatic tire by the surfaces of the tread portion 2 being successively brought into contact with the road surface as described above. By this, the vehicle can transmit driving force, braking force, and turning force to a road surface due to the friction force between the pneumatic tire 1 and the road surface and can be driven by the driving force, the braking force, and the turning force.

Static electricity may also be generated during traveling of a vehicle, and such static electricity flows from the rim R through the bead portion rubber 30 and the linear conductive portion 50 to the belt layer 14, then flows from the belt layer 14 to the tread rubber 15, and discharged from the tread rubber 15 to a road surface. Accordingly, the static electricity generated in the vehicle is discharged to the road surface, and electrostatic charge in the vehicle due to the static electricity is suppressed.

In other words, the linear conductive portion 50 having a volume resistivity of less than $1\times10^{\wedge}8$ $\Omega$·cm relatively facilitates flow of electricity and thus can reduce tire electrical resistance that is electrical resistance of the pneumatic tire 1. Accordingly, the pneumatic tire 1 including the linear conductive portion 50 can flow static electricity generated during traveling of a vehicle from the bead portion rubber 30 side to the belt layer 14 side through the linear conductive portion 50 and can suppress electrostatic charging of the vehicle due to static electricity.

Here, during traveling of the vehicle, the tread portion 2, the sidewall portion 3, and the like rotate while being deformed due to a load caused corresponding to the traveling condition of the vehicle. The tread portion 2 and the sidewall portion 3 include various members layered, and when the tread portion 2 and the sidewall portion 3 are deformed, shear force tends to occur in a direction in which members constituting these portions are shifted.

Because of this, in a case where the linear conductive portion 50 playing a part in flowing static electricity generated during traveling of the vehicle to a road surface is disposed, for example, between the carcass layer 13 and the tire inner surface rubber layer 20, the shear force in a direction in which the carcass layer 13 and the tire inner surface rubber layer 20 are shifted may break the linear conductive portion 50. In other words, in a case where the shear force occurs in a direction in which the carcass layer 13 and the tire inner surface rubber layer 20 are shifted, the linear conductive portion 50 disposed therebetween is rubbed by the carcass layer 13 and the tire inner surface rubber layer 20, and thus the linear conductive portion 50 may be repeatedly rubbed and broken when the shear force repeatedly occurs in a direction in which the carcass layer 13 and the tire inner surface rubber layer 20 are shifted.

Because the conductive path from the rim R to the belt layer 14 is broken when the linear conductive portion 50 is broken, it becomes difficult for static electricity generated in the vehicle to be discharged to the road surface; however, in the pneumatic tire 1 according to the present embodiment, the linear conductive portion 50 is disposed on the tire inner surface rubber layer 20 exposed to the tire inner cavity side. Because of this, even in a case where the tread portion 2 or the sidewall portion 3 is deformed, the linear conductive portion 50 is not rubbed by other members, and thus the conductive path between the bead portion rubber 30 and the belt layer 14 can be ensured by the linear conductive portion 50 even after the pneumatic tire 1 travels for a long distance. Accordingly, when the pneumatic tire 1 travels for a long distance, increase in the tire electrical resistance due to breakage of the linear conductive portion 50 can be suppressed. As a result, the tire electrical resistance after travel can be maintained.

Because the linear conductive portion 50 has a relationship between the width Lbp of the belt layer 14 in the periphery direction and the lap width La of the linear conductive portion 50 with respect to the belt layer 14 satisfying $0.01 \leq La/Lbp \leq 1$, the conductive path between the bead portion rubber 30 and the belt layer 14 can be reliably ensured by the linear conductive portion 50. In other words, in a case where the relationship between the width Lbp of the belt layer 14 and the lap width La of the linear conductive portion 50 with respect to the belt layer 14 is $La/Lbp < 0.01$, because the lap width La of the linear conductive portion 50 with respect to the belt layer 14 is too small, it may be difficult to ensure adequate electrical conductivity between the linear conductive portion 50 and the belt layer 14. In this case, even if a linear conductive portion 50 is provided, it may be difficult to ensure the conductive path between the bead portion rubber 30 and the belt layer 14 and, as a result, it may be difficult to effectively reduce tire electrical resistance.

In contrast, in a case where the relationship between the width Lbp of the belt layer 14 and the lap width La of the linear conductive portion 50 with respect to the belt layer 14 satisfies $0.01 \leq La/Lbp \leq 1$, adequate electrical conductivity between the linear conductive portion 50 and the belt layer 14 can be ensured, and the conductive path between the bead portion rubber 30 and the belt layer 14 can be reliably ensured by the linear conductive portion 50. As a result, tire electrical resistance can be reliably reduced by the linear conductive portion 50.

The bead portion rubber 30 has a volume resistivity of less than $1 \times 10^{\circ}8$ Ω·cm, and the linear conductive portion 50 satisfies the relationship of the surface length Lbg of the bead portion rubber 30 and the length Lbc of a portion of the linear conductive portion 50 overlapping the bead portion rubber 30 of $0.01 \leq Lbc/Lbg \leq 1.00$, and thus the conductive path between the bead portion rubber 30 and the belt layer 14 can be reliably ensured by the linear conductive portion 50. In other words, in a case where the relationship between the surface length Lbg of the bead portion rubber 30 and the length Lbc of the portion of the linear conductive portion 50 overlapping the bead portion rubber 30 is Lbc/Lbg<0.01, the length Lbc of the portion of the linear conductive portion 50 overlapping the bead portion rubber 30 is too short, and thus it may be difficult to ensure adequate electrical conductivity between the linear conductive portion 50 and the bead portion rubber 30. In this case, even if a linear conductive portion 50 is provided, it may be difficult to ensure the conductive path between the bead portion rubber 30 and the belt layer 14 and, as a result, it may be difficult to effectively reduce tire electrical resistance.

In contrast, in a case where the relationship of the surface length Lbg of the bead portion rubber 30 and the length Lbc of a portion of the linear conductive portion 50 overlapping the bead portion rubber 30 of $0.01 \leq Lbc/Lbg \leq 1.00$ is satisfied, adequate electrical conductivity between the linear conductive portion 50 and the bead portion rubber 30 can be ensured, and the conductive path between the bead portion rubber 30 and the belt layer 14 can be ensured by the linear conductive portion 50. As a result, tire electrical resistance can be more reliably reduced by the linear conductive portion 50.

Because multiple linear conductive portions are disposed, multiple conductive paths between the bead portion rubber 30 and the belt layer 14, the tire electrical resistance can be further reduced. Since the plurality of the linear conductive portions 50 is disposed without overlapping each other, even after travel for a long distance, the conductive paths from the rim R to the belt layer 14 can be ensured by the linear conductive portions 50. In other words, in a case where the linear conductive portions 50 are disposed in a manner that the linear conductive portions 50 are overlapped each other, the linear conductive portions 50 may rub each other due to tire deformation during travel, and the linear conductive portions 50 may be broken due to the rubbing of the linear conductive portions 50. In a case where the linear conductive portion 50 is broken, because it becomes difficult to ensure the conductive path from the rim R to the belt layer 14 by the linear conductive portion 50, in a pneumatic tire 1 after breakage of the linear conductive portion 50, tire electrical resistance may increase compared to a pneumatic tire 1 before breakage of the linear conductive portion 50.

In contrast, since the plurality of linear conductive portions 50 is disposed without overlapping each other in the pneumatic tire 1 according to the embodiment, rubbing of the linear conductive portions 50 can be suppressed, and breakage of the linear conductive portions 50 due to rubbing of the linear conductive portions 50 can be suppressed. Accordingly, even after travel for a long distance, the conductive paths from the rim R to the belt layer 14 can be ensured by the linear conductive portions 50. As a result, increase in the tire electrical resistance after travel can be suppressed.

Because the linear conductive portion 50 is made by intertwining a plurality of linear members including at least one conductive linear member 51 having a volume resistivity of less than $1 \times 10^{\circ}8$ Ω·cm, strength of the linear conductive portion 50 can be ensured while a desired electric resistivity is ensured. That is, making the linear conductive portion 50 have a stranded wire structure having the plurality of linear members can improve strength against repeated fatigue and elongation compared to that of a structure in which the linear conductive portion 50 is a monofilament. As a result, the durability of the linear conductive portion 50 can be more reliably improved while tire electrical resistance is reduced.

Because the linear conductive portion 50 is made by intertwining a conductive linear member 51 and a non-conductive linear member 52 having a volume resistivity of $1 \times 10^{\circ}8$ Ω·cm or more, a weakness of the linear conductive portion 50 can be compensated by the non-conductive linear member 52 while a desired electric resistivity is ensured. As a result, strength, heat resistance, and dimensional stability of the linear conductive portion 50 can be appropriately ensured, and durability of the linear conductive portion 50 can be more reliably improved.

The linear conductive portion 50 can more reliably and appropriately have strength, heat resistance, and dimensional stability by making the 1 conductive linear member 51 a metal fiber and the non-conductive linear member 52 an organic fiber. As a result, the durability of the linear conductive portion 50 can be more reliably improved.

The linear conductive portion 50 can have strength while having a desired electric resistivity by forming the conductive linear member 51 by intertwining a plurality of carbon fibers. As a result, the durability of the linear conductive portion 50 can be more reliably improved while tire electrical resistance is reduced.

The linear conductive portion 50 can easily have a desired electric resistivity by forming the conductive linear member 51 of a monofilament cord containing a carbon fiber. As a result, reduction in the tire electrical resistance can be further easily attempted.

In addition, since the linear conductive portion 50 has the total fineness of 20 dtex or more and 1000 dtex or less, the total fineness of the linear conductive portion 50 can be properly set. In other words, when the total fineness of the linear conductive portion 50 is 20 dtex or more, breakage of the linear conductive portion 50 upon manufacture of the tire can be suppressed. Furthermore, when the total fineness of the linear conductive portion 50 is 1000 dtex or less, breakage of the linear conductive portion 50 during rolling of the tire can be suppressed.

Since the linear conductive portion 50 has an elongation ratio of 1.0% or more and 70.0% or less, the elongation ratio of the linear conductive portion 50 can be made proper. In other words, when the elongation ratio of the linear conductive portion 50 is 1.0% or more, breakage of the linear conductive portion 50 upon manufacture of the tire can be suppressed. Because the elongation ratio is 70.0% or less, breaking of the linear conductive portion 50 during rolling of the tire can be suppressed.

MODIFIED EXAMPLES

Figure 9:
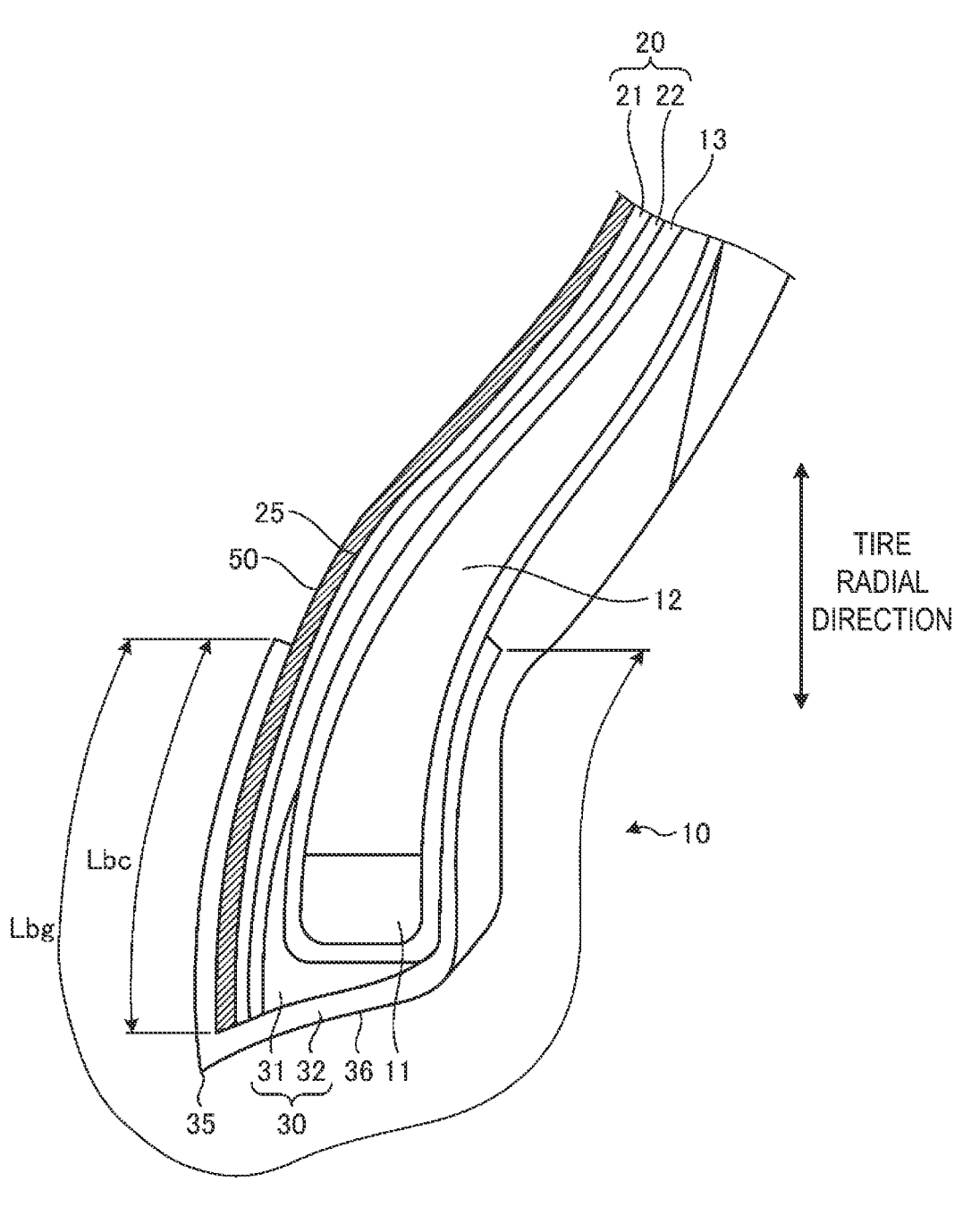
FIG. 9 is a modified example of a pneumatic tire according to an embodiment and is an explanatory diagram in a case where a linear conductive portion is positioned on an outer side in the tire width direction of a bead portion rubber.

In the embodiment described above, the linear conductive portion 50 is positioned on the inner side of the bead portion rubber 30 in the tire width direction at a position of the bead portion 10; however, the linear conductive portion 50 may be positioned on the outer side of the bead portion rubber 30 in the tire width direction at a position of the bead portion 10. FIG. 9 is a modified example of a pneumatic tire 1 according to an embodiment and is an explanatory diagram in a case where a linear conductive portion 50 is positioned on the outer side of a bead portion rubber 30 in the tire width direction. As illustrated in FIG. 9, for example, the linear conductive portion 50 is positioned on the outer side in the tire width direction with respect to the portion positioned on the inner side in the tire width direction than the bead core 11 in the chafer 32 included in the bead portion rubber 30.

In other words, as illustrated in FIG. 9, in a case where the portion positioned in the bead portion 10 in the tire inner surface rubber layer 20 is positioned on the outer side in the tire width direction with respect to the chafer 32 included in the bead portion rubber 30 at a position on the inner side in the tire width direction from the bead core 11, the linear conductive portion 50 disposed along the tire inner surface rubber layer 20 may be disposed between the tire inner surface rubber layer 20 and the chafer 32. Since the FIG. 9 is a cross-section at a position of the linear conductive portion 50, the portion positioned on the inner side in the tire width direction from the bead core 11 in the chafer 32 covers the linear conductive portion 50; however, the chafer 32 covers the tire inner surface rubber layer 20 in a portion other than the portion at which the linear conductive portion 50 is positioned in the tire circumferential direction.

Because the linear conductive portion 50 is disposed on the outer side of the chafer 32 included in the bead portion rubber 30 in the tire width direction as described above and disposed between the tire inner surface rubber layer 20 and the chafer 32, the linear conductive portion 50 can be in direct contact with the chafer 32. Accordingly, the conductive path between the linear conductive portion 50 and the bead portion rubber 30 can be more reliably ensured, and the tire electrical resistance can be more reliably reduced by the linear conductive portion 50.

Figure 10:
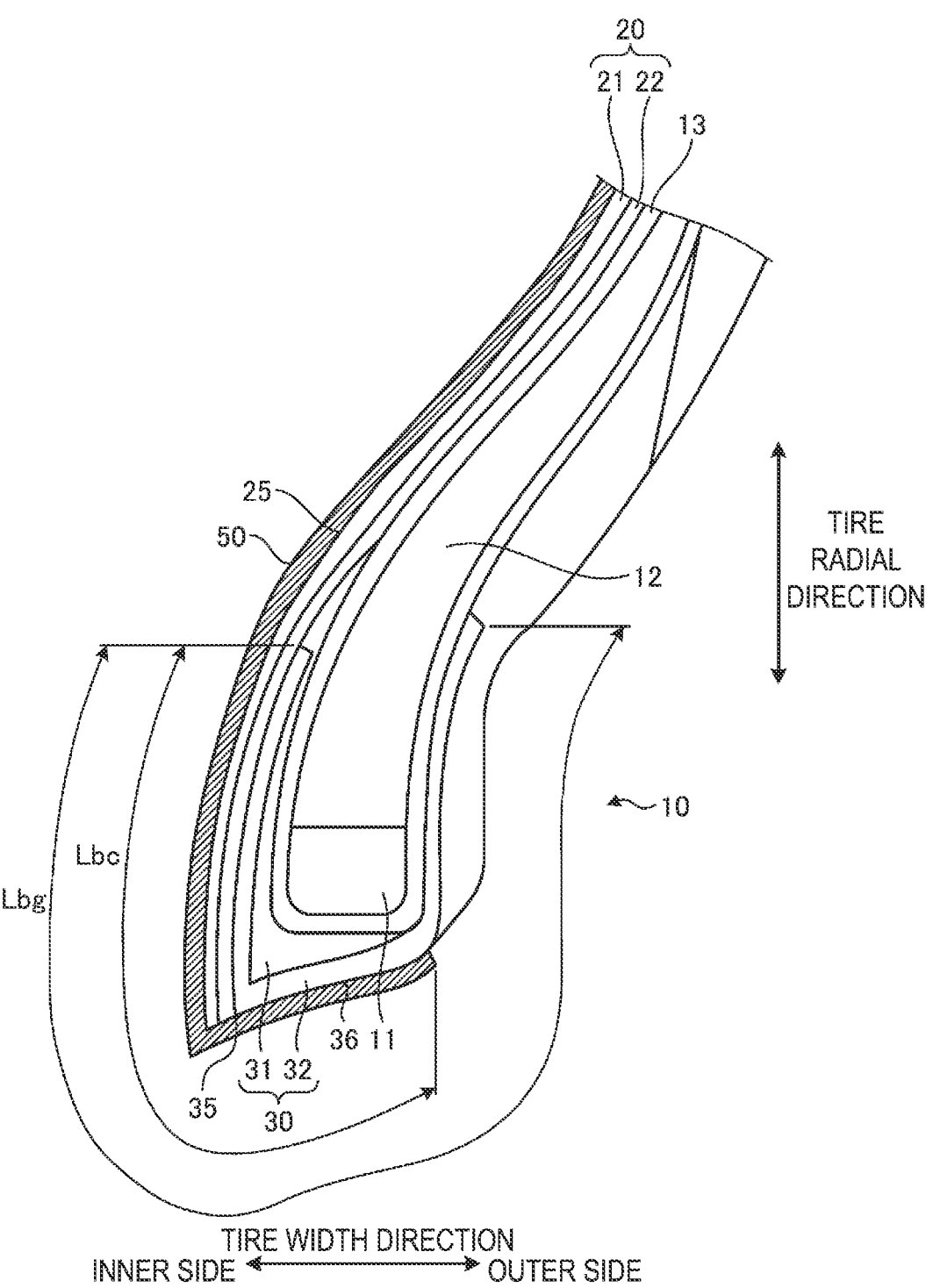
FIG. 10 is a modified example of a pneumatic tire according to an embodiment and is an explanatory diagram in a case where a linear conductive portion extends to a bead base beyond a bead toe.

In the embodiment described above, the linear conductive portion 50 is positioned on the outer side of the bead toe 35 in the tire radial direction at a position of the bead portion 10; however, the linear conductive portion 50 may extend from the tire inner surface 25 side to the bead base 36 beyond the bead toe 35 of the bead portion 10. FIG. 10 is a modified example of a pneumatic tire 1 according to an embodiment and is an explanatory diagram in a case where a linear conductive portion 50 extends to a bead base 36 beyond a bead toe 35. FIG. 1 is a modified example of a pneumatic tire 1 according to an embodiment and is an explanatory diagram in a case where a linear conductive portion 50 extends to an outer side in a tire width direction of a bead core 11 beyond a bead toe 35. As illustrated in FIG. 10, for example, in a case where the tire inner surface rubber layer 20 and the linear conductive portion 50 are positioned on the inner side in the tire width direction with respect to the portion positioned on the inner side in the tire width direction from the bead core 11 in the chafer 32 included in the bead portion rubber 30, the linear conductive portion 50 may extend from the tire inner surface 25 side to the bead base 36 beyond the bead toe 35.

Figure 11:
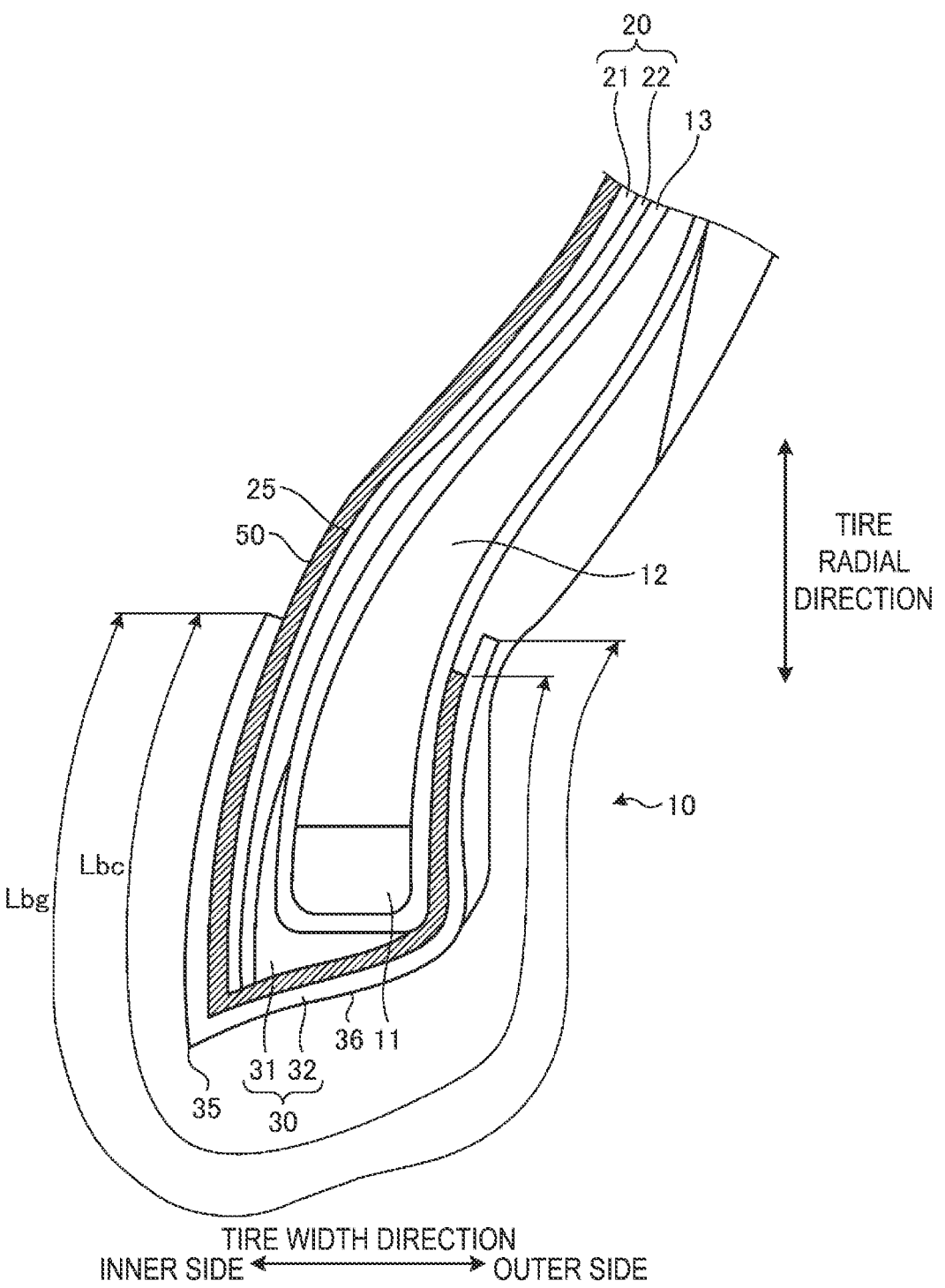
FIG. 11 is a modified example of a pneumatic tire according to an embodiment and is an explanatory diagram in a case where a linear conductive portion extends to an outer side in a tire width direction of a bead core beyond a bead toe.

In addition, as illustrated in FIG. 11, for example, in a case where the tire inner surface rubber layer 20 and the linear conductive portion 50 are positioned on the outer side in the tire width direction with respect to the portion positioned on the inner side in the tire width direction from the bead core 11 in the chafer 32 included in the bead portion rubber 30, the linear conductive portion 50 may extend from the tire inner surface 25 side to the bead base 36 beyond the bead toe 35 and further extend to the outer side of the bead core 11 in the tire width direction. The linear conductive portion 50 extends from the tire inner surface 25 side to at least the bead base 36 beyond the bead toe 35 as described above, the distance for the overlapping of the linear conductive portion 50 and the bead portion rubber 30 can be made longer.

In other words, the linear conductive portion 50 extends from the tire inner surface 25 side to at least the bead base 36 beyond the bead toe 35 at least, and thus Lbc/Lbg that is a relationship between the surface length Lbg of the bead portion rubber 30 in the periphery direction and the length Lbc of the portion of the linear conductive portion 50 overlapping the bead portion rubber 30 can be made larger. Accordingly, because the linear conductive portion 50 facilitates flow of electricity between the linear conductive portion 50 and the bead portion rubber 30, the linear conductive portion 50 can facilitate flow of static electricity from the vehicle more effectively from the rim R to the linear conductive portion 50, and tire electrical resistance can be reduced.

Figure 12:
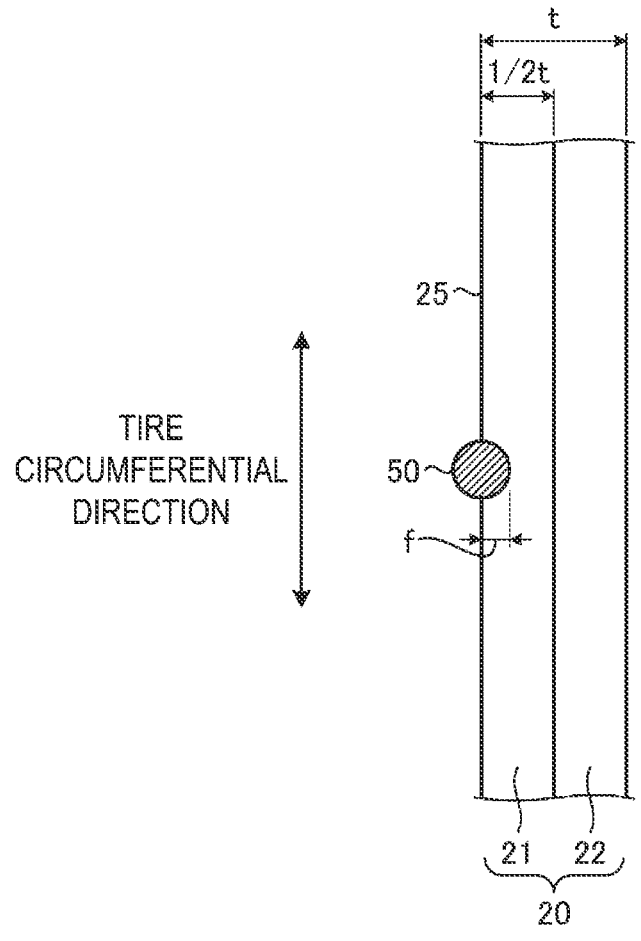
FIG. 12 is a modified example of a pneumatic tire according to an embodiment and is an explanatory diagram in a case where a portion of a linear conductive portion at a predetermined position is embedded in a tire inner surface rubber layer.
Figure 13:
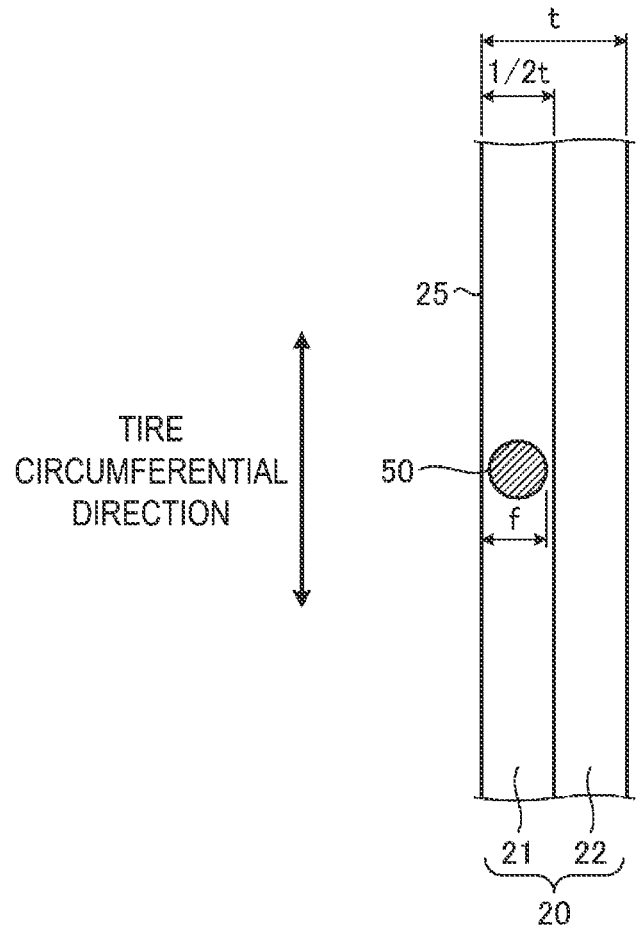
FIG. 13 is a modified example of a pneumatic tire according to an embodiment and is an explanatory diagram in a case where an entire linear conductive portion at a predetermined position is embedded in a tire inner surface rubber layer.

In the embodiments described above, the linear conductive portion 50 is disposed on the tire inner surface 25 of the tire inner surface rubber layer 20, and the linear conductive portion 50 may be embedded in the tire inner surface rubber layer 20. FIG. 12 is a modified example of a pneumatic tire 1 according to an embodiment and is an explanatory diagram in a case where a portion of a linear conductive portion 50 at a predetermined position is embedded in a tire inner surface rubber layer 20. FIG. 13 is a modified example of a pneumatic tire 1 according to an embodiment and is an explanatory diagram in a case where an entire linear conductive portion 50 at a predetermined position is embedded in a tire inner surface rubber layer 20. For example, as illustrated in FIG. 12, the linear conductive portion 50 may be partially embedded in the tire inner surface rubber layer 20 from the tire inner surface 25 side at a position in the extension direction of the linear conductive portion 50. Alternatively, for example, as illustrated in FIG. 13, the linear conductive portion 50 may be entirely embedded in the tire inner surface rubber layer 20 from the tire inner surface 25 side at a position in the extension direction of the linear conductive portion 50. In other words, the linear conductive portion 50 is at least partially exposed to the tire inner cavity side As illustrated in FIGS. 12 and 13, the linear, conductive portion 50 may be disposed with a portion embedded in the tire inner surface rubber layer 20.

As described above, in embedding the linear conductive portion 50 in the tire inner surface rubber layer 20, an embedded amount of the linear conductive portion 50 from the tire inner surface 25 side into the tire inner surface rubber layer 20 is f, a thickness of the tire inner surface rubber layer 20 is t, and the linear conductive portion 50 preferably has the embedded amount f in a region having a largest embedded amount f into the tire inner surface rubber layer 20 satisfying f/t<0.5. The embedded amount f of the linear conductive portion 50 in this case is measured by a distance between the tire inner surface 25 and a portion of the linear conductive portion 50 that is the most distance from the tire inner surface 25 of the tire inner surface rubber layer 20 toward the tire outer side.

In other words, in a case where the relationship between the embedded amount f of the linear conductive portion 50 into the tire inner surface rubber layer 20 and the thickness t of the tire inner surface rubber layer 20 is f/t≥0.5, the linear conductive portion 50 tends to be rubbed by the surrounding tire inner surface rubber layer 20 during travel, and the linear conductive portion 50 may be broken when travel is repeated. In this case, it becomes difficult to ensure the conductive path by the linear conductive portion 50, it may be difficult to reduce tire electrical resistance by the linear conductive portion 50.

In contrast, in a case where the relationship between the embedded amount f of the linear conductive portion 50 into the tire inner surface rubber layer 20 and the thickness t of the tire inner surface rubber layer 20 satisfies f/t<0.5, the proportion of the exposure of the linear conductive portion 50 on the tire inner surface rubber layer 20 can be increased. In this way, the linear conductive portion 50 is less likely to be rubbed by the tire inner surface rubber layer 20 during travel, and even when travel is repeated, breakage is less likely to occur, and thus the conductive path between the bead portion rubber 30 and the belt layer 14 can be ensured without interruption. As a result, tire electrical resistance can be reliably reduced by the linear conductive portion 50.

The linear conductive portion 50 is preferably disposed in a manner that not less than 60% of the length of the linear conductive portion 50 in the extension direction is exposed to the tire inner cavity side. A part of the linear conductive portion 50 may be embedded in the tire inner surface rubber layer 20 as long as not less than 60% of the length of the linear conductive portion 50 is exposed to the tire inner cavity side.

Furthermore, the linear conductive portion 50 may be disposed by adhering the linear conductive portion 50 onto the tire inner surface 25 using an adhesive after tire formation, or the linear conductive portion 50 may be disposed by embedding into the tire inner surface rubber layer 20 during tire formation.

Figure 14:
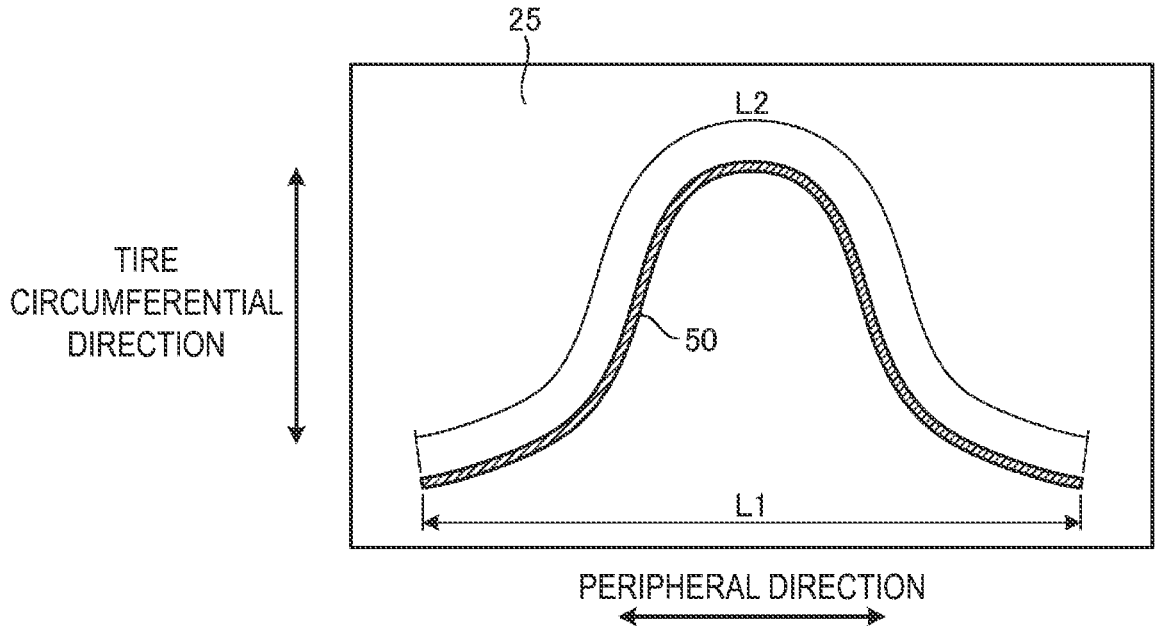
FIG. 14 is a modified example of a pneumatic tire according to an embodiment and is an explanatory diagram in a case where an actual length of a linear conductive portion is longer than a length in a periphery direction.

In the embodiments described above, the linear conductive portion 50 is disposed along the periphery direction, and the linear conductive portion 50 may be disposed not along the periphery direction. FIG. 14 is a modified example of a pneumatic tire 1 according to an embodiment and is an explanatory diagram in a case where an actual length L2 of a linear conductive portion 50 is longer than a length L1 in a periphery direction. FIG. 14 is a developed view in which a pneumatic tire 1 is extended and illustrated by setting the periphery direction as a lateral direction of the drawing. For example, the linear conductive portion 50 is disposed while the linear conductive portion 50 is curved in the tire circumferential direction with respect to the periphery direction as illustrated in FIG. 14, the total length L2 that is the actual length of the linear conductive portion 50 may be longer than the length L1 of the linear conductive portion 50 in the periphery direction. Making the total length L2 longer than the length L1 in the periphery direction allows the tension of the linear conductive portion 50 to be reduced and breakage of the linear conductive portion 50 due to repeated bending and deformation caused by rolling of the pneumatic tire 1 to be suppressed. This makes the linear conductive portion 50 difficult to break even when traveling is repeated, and thus the conductive path between the bead portion rubber 30 and the belt layer 14 can be ensured without interruption, and increase in tire electrical resistance after travel can be suppressed.

Furthermore, in a case where the total length L2 of the linear conductive portion 50 is made longer than the length L1 of the linear conductive portion 50 in the periphery direction, the linear conductive portion 50 preferably has a relationship between a length L1 of the linear conductive portion 50 in the periphery direction and a total length L2 of the linear conductive portion 50 satisfying 1<L2/L1<5. In other words, in a case where the relationship between the length L1 of the linear conductive portion 50 in the periphery direction and the total length L2 of the linear conductive portion 50 is L2/L1≥5, the total length L2 of the linear conductive portion 50 may be too long, and electrical resistance of the linear conductive portion 50 itself may be large. In this case, even if the linear conductive portion 50 is disposed, it may be difficult to effectively reduce electrical resistance between the bead portion rubber 30 and the belt layer 14.

In contrast, in a case where the relationship between the length L1 of the linear conductive portion 50 in the periphery direction and the total length L2 of the linear conductive portion 50 satisfies 1<L2/L1<5, the electrical resistance between the bead portion rubber 30 and the belt layer 14 can be effectively reduced by the linear conductive portion 50 without increasing the electrical resistance of the linear conductive portion 50 itself. As a result, tire electrical resistance can be reliably reduced by the linear conductive portion 50.

Figure 15:
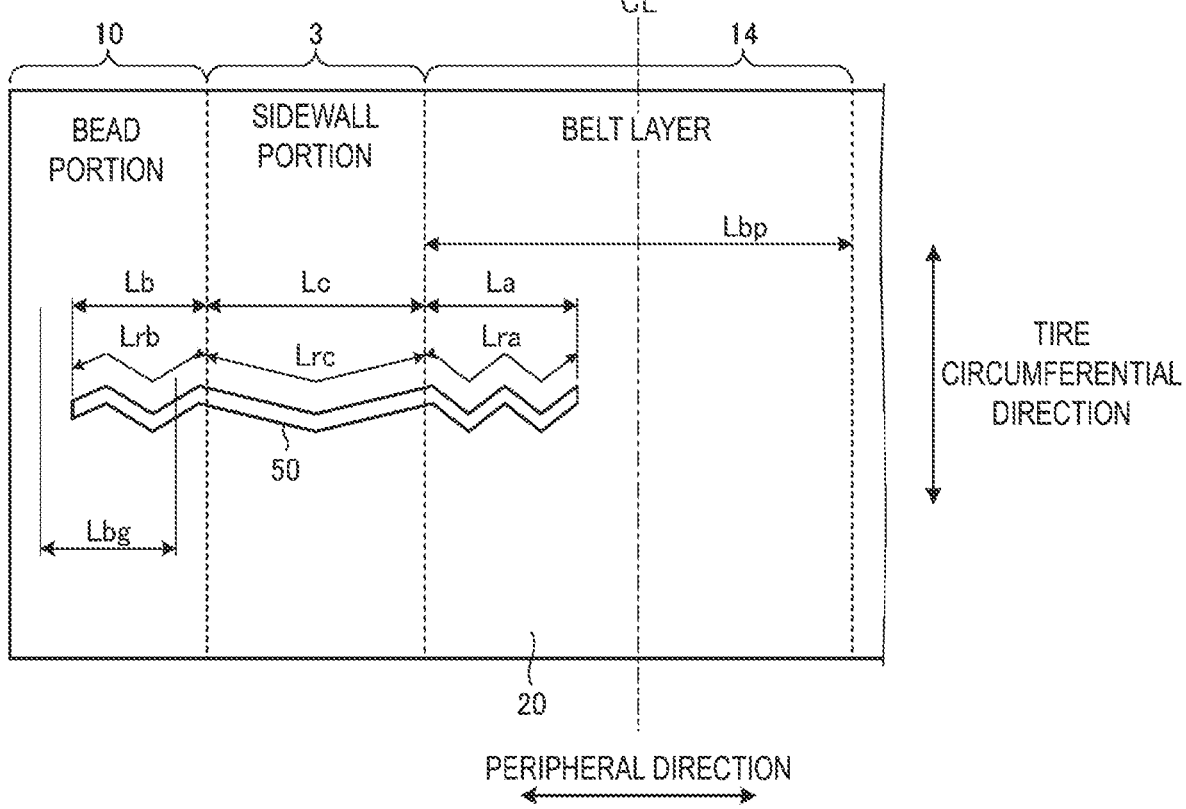
FIG. 15 is a modified example of a pneumatic tire according to an embodiment and is an explanatory diagram in a case where a proportion of an actual length of a linear conductive portion is varied for each position in the pneumatic tire.

In a case where the actual length of the linear conductive portion 50 is longer than the length of the linear conductive portion 50 in the periphery direction, a proportion of an actual length of the linear conductive portion 50 may be varied for each position in the pneumatic tire 1. FIG. 15 is a modified example of a pneumatic tire 1 according to an embodiment and is an explanatory diagram in a case where the proportion of the actual length of the linear conductive portion 50 is varied for each position in the pneumatic tire 1. FIG. 15 is a developed view in which a pneumatic tire 1 is extended and illustrated by setting the periphery direction as a lateral direction of the drawing. For example, the linear conductive portion 50 preferably has the relationship between the portion of the linear conductive portion 50 positioned between a position on the inner side of the belt layer 14 in the tire radial direction and the bead portion 10, that is, the distance Lc of the portion positioned on the sidewall portion 3 in the periphery direction, and the actual length Lrc of the portion of the linear conductive portion 50 positioned on the sidewall portion 3 satisfying 1.0<Lrc/Lc<3.0. Accordingly, the linear conductive portion 50 can be disposed in an adequate length at a position in the sidewall portion 3 in a manner that the actual length Lrc with respect to the distance Lc in the periphery direction is not too long, and electrical resistance can be effectively reduced by the linear conductive portion 50.

For the linear conductive portion 50, the relationship between the distance La in the periphery direction of a portion of the linear conductive portion 50 positioned on the inner side of the belt layer 14 in the tire radial direction and the length Lra of a portion of the linear conductive portion 50 positioned on the inner side of the belt layer 14 in the tire radial direction preferably satisfies Lrc/Lc<Lra/La<8.0. Accordingly, the linear conductive portion 50 can be disposed overlapping the belt layer 14 in a more reliably long length at a portion of the linear conductive portion 50 positioned on the inner side of the belt layer 14 in the tire radial direction, and electrical resistance between the belt layer 14 and the linear conductive portion 50 can be more reliably reduced.

For the linear conductive portion 50, the relationship between the distance Lb in the periphery direction of a portion of the linear conductive portion 50 positioned in bead portion 10 and the length Lrb of a portion of the linear conductive portion 50 positioned in the bead portion 10 preferably satisfies Lrc/Lc<Lrb/Lb<8.0. Accordingly, the linear conductive portion 50 can be disposed overlapping the bead portion rubber 30 in a more reliably long length at a portion of the linear conductive portion 50 positioned in the bead portion 10, and electrical resistance between the bead portion rubber 30 and the linear conductive portion 50 can be more reliably reduced. By these, by effectively reducing the electrical resistance between the bead portion rubber 30 and the belt layer 14, the linear conductive portion 50 can more reliably reduce the tire electrical resistance and, by allowing an arrangement where the actual length is longer than the length in the periphery direction, the breakage of the linear conductive portion 50 can be suppressed, and the durability of the linear conductive portion 50 can be ensured.

Figure 16:
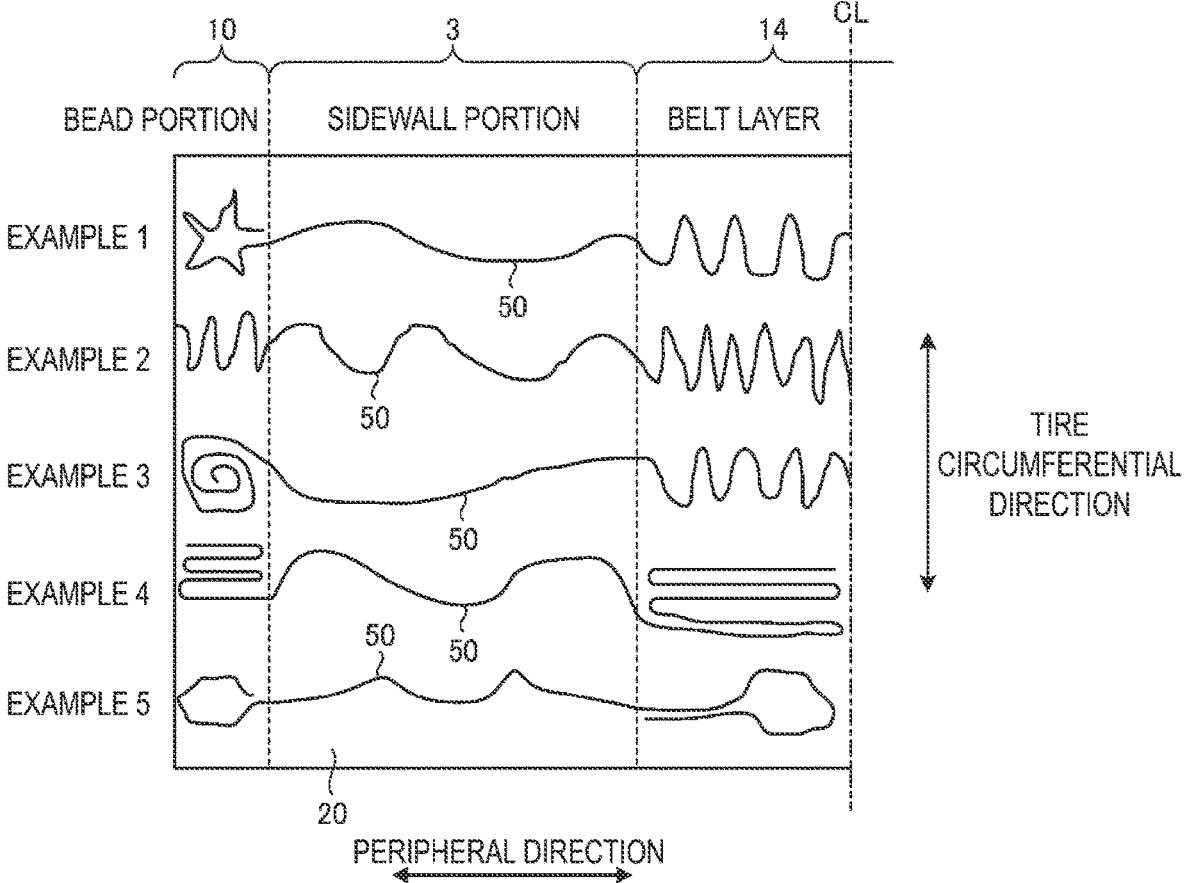
FIG. 16 is an explanatory diagram illustrating examples of arrangement configurations of linear conductive portions.

As described above, in a case where the length of the linear conductive portion 50 is made longer at a position on the inner side of the belt layer 14 in the tire radial direction or a position in the bead portion 10, the linear conductive portion 50 may be disposed in various forms to make the length longer. FIG. 16 is an explanatory diagram illustrating examples of arrangement configurations of linear conductive portions 50. FIG. 16 is a developed view in which a pneumatic tire 1 is extended and illustrated by setting the periphery direction as a lateral direction of the drawing. For example, the linear conductive portion 50 may be disposed in a manner that the linear conductive portion 50 extends in the periphery direction with oscillation in the tire circumferential direction at a position on the inner side of the belt layer 14 in the tire radial direction as in Examples 1 to 3 of FIG. 16, may be disposed with oscillation in the periphery direction as in Example 4, or may be disposed circling as in Example 5.

The linear conductive portion 50 may be disposed circling at a position in the bead portion 10 as in Example 1 and Example 5 of FIG. 16, may be disposed with oscillation in the tire circumferential direction while extending in the periphery direction as in Example 2, may be disposed in a swirl shape as in Example 3, or may be disposed with oscillation in the periphery direction as in Example 4. The arrangement configuration of the linear conductive portion 50 for making the actual length of the linear conductive portion 50 longer than the length in the periphery direction in a position on the inner side of the belt layer 14 in the tire radial direction or a position in the bead portion 10 is not limited as long as the configuration can suppress excessive increase in electrical resistance of the linear conductive portion 50 itself due to the length of the linear conductive portion 50 being excessively long.

Figure 17:
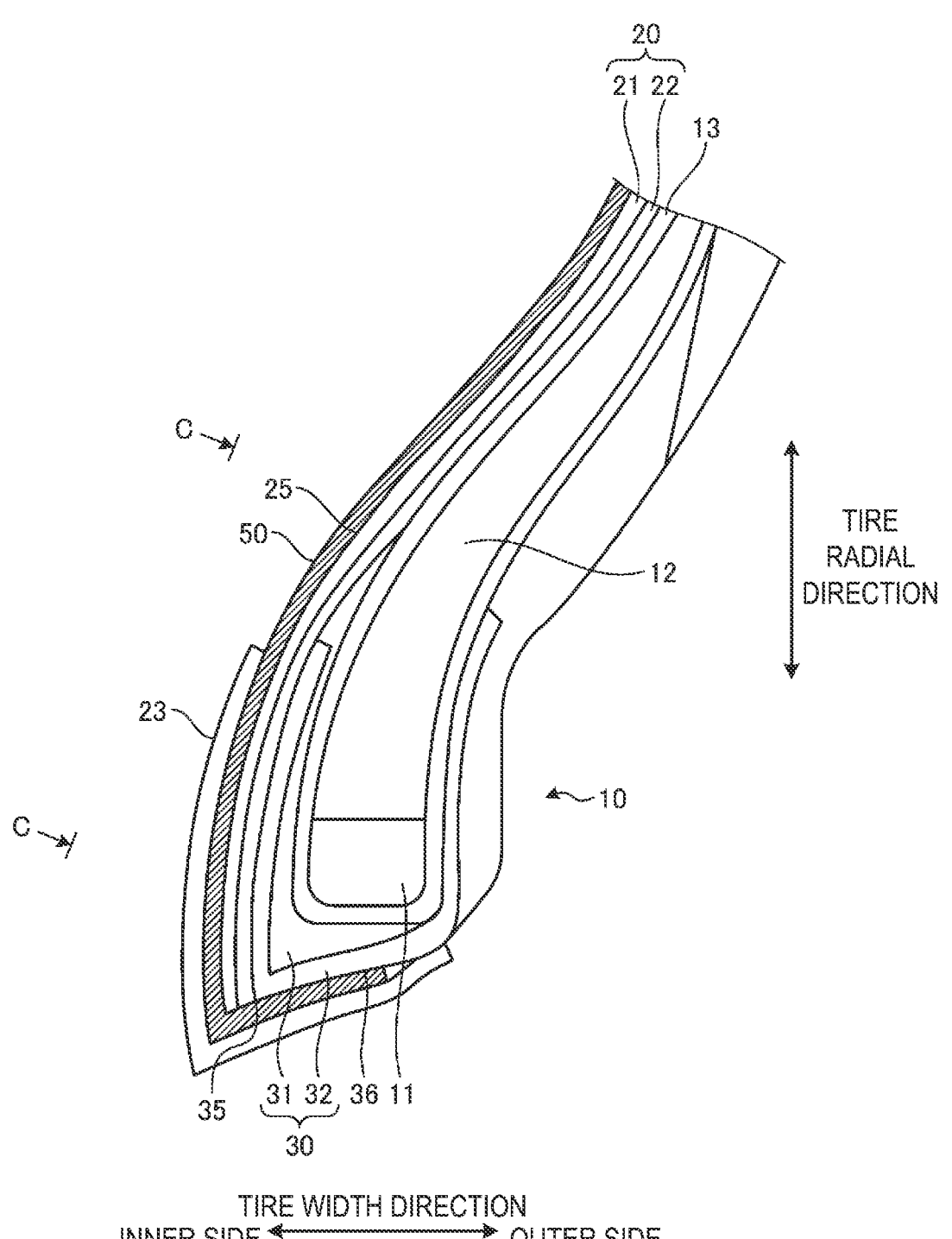
FIG. 17 is a modified example of a pneumatic tire according to an embodiment and is an explanatory diagram in a case where a cover rubber layer is disposed.
Figure 18:
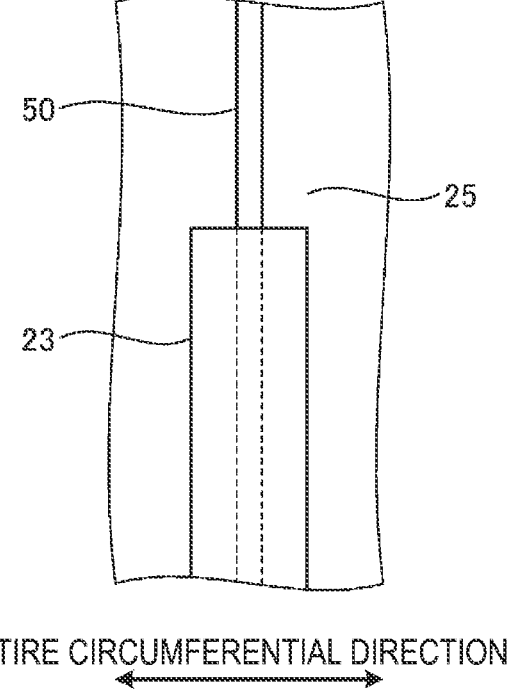
FIG. 18 is a view in the direction of arrows C-C in FIG. 17.

In the embodiments described above, the linear conductive portion 50 is disposed on the tire inner surface 25 of the tire inner surface rubber layer 20, and the linear conductive portion 50 may be partially covered by another member. FIG. 17 is a modified example of a pneumatic tire 1 according to an embodiment and is an explanatory diagram in a case where a cover rubber layer 23 is disposed. FIG. 18 is a view in the direction of arrows C-C in FIG. 17. For example, the linear conductive portion 50 may be partially covered by a cover rubber layer 23 as illustrated in FIGS. 17 and 18. That is, the pneumatic tire 1 may further include a cover rubber layer 23 provided on a tire inner cavity side of the linear conductive portion 50 and covering part of the linear conductive portion 50. The cover rubber layer 23 in this case is a band-like member made of a rubber material.

For example, the band-like cover rubber layer 23 is disposed covering a portion of the linear conductive portion 50 exposed on the bead portion rubber 30 in a case where the linear conductive portion 50 is disposed and exposed without being covered by the bead portion rubber 30 in the bead portion 10. That is, in a case where the linear conductive portion 50 is exposed to the tire inner cavity side or the bead base 36 side, the cover rubber layer 23 is preferably disposed covering the linear conductive portion 50 from the tire inner cavity side to the bead base 36 side in the bead portion 10.

By disposing the cover rubber layer 23 in the bead portion 10 and covering the linear conductive portion 50 with the cover rubber layer 23 as described above, damage of the linear conductive portion 50 caused by contact with a tire lever during rim assembly can be prevented. In this way, cut of the linear conductive portion 50 during travel can be suppressed, and thus tire electrical resistance can be more reliably reduced even after the travel.

In a case where the cover rubber layer 23 covering the linear conductive portion 50 is disposed in this manner, the thickness of the cover rubber layer 23 is preferably less than 1 mm. A thickness of the cover rubber layer 23 is 1 mm or more leads to degradation in rolling resistance of the pneumatic tire 1, and thus the thickness of the cover rubber layer 23 covering the linear conductive portion 50 is preferably less than 1 mm.

As a range where the cover rubber layer 23 is disposed, the cover rubber layer 23 is preferably disposed within a range of one third or less of the tire cross-sectional height SH (see FIG. 2) on the outer side in the tire radial direction from the measurement point of the rim diameter. That is, since the region outside of one third of the tire cross-sectional height SH on the outer side in the tire radial direction from the measurement point of the rim diameter undergoes larger deformation of the tire, disposing the cover rubber layer 23 in this region leads to degradation in rolling resistance of the pneumatic tire 1. Thus, the cover rubber layer 23 is preferably disposed within a range of one third or less of the tire cross-sectional height SH on the outer side in the tire radial direction from the measurement point of the rim diameter.

Figure 19:
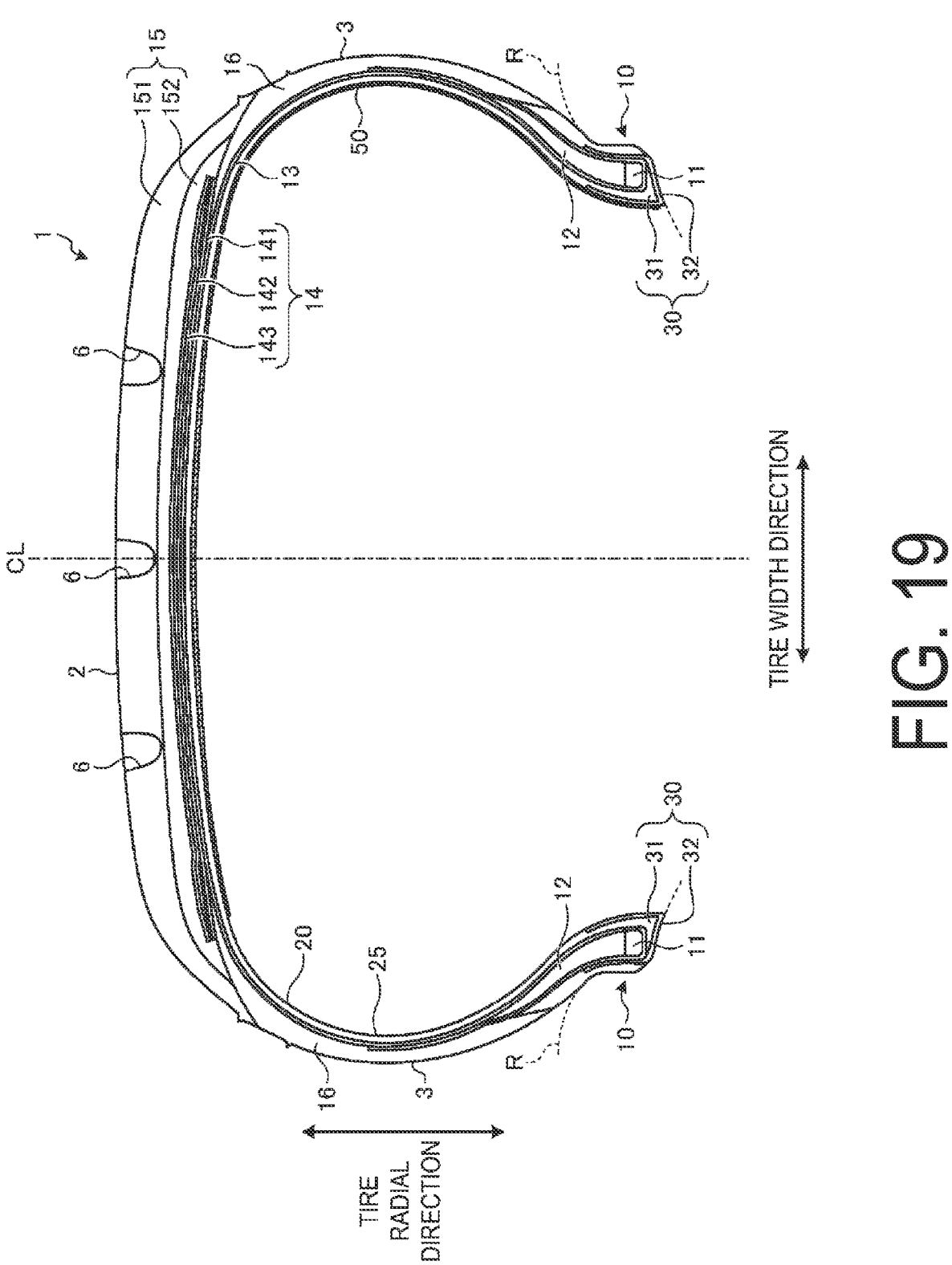
FIG. 19 is a modified example of a pneumatic tire according to an embodiment and is an explanatory diagram in a case where a linear conductive portion is disposed over a tire equatorial plane in a tire width direction.
Figure 20:
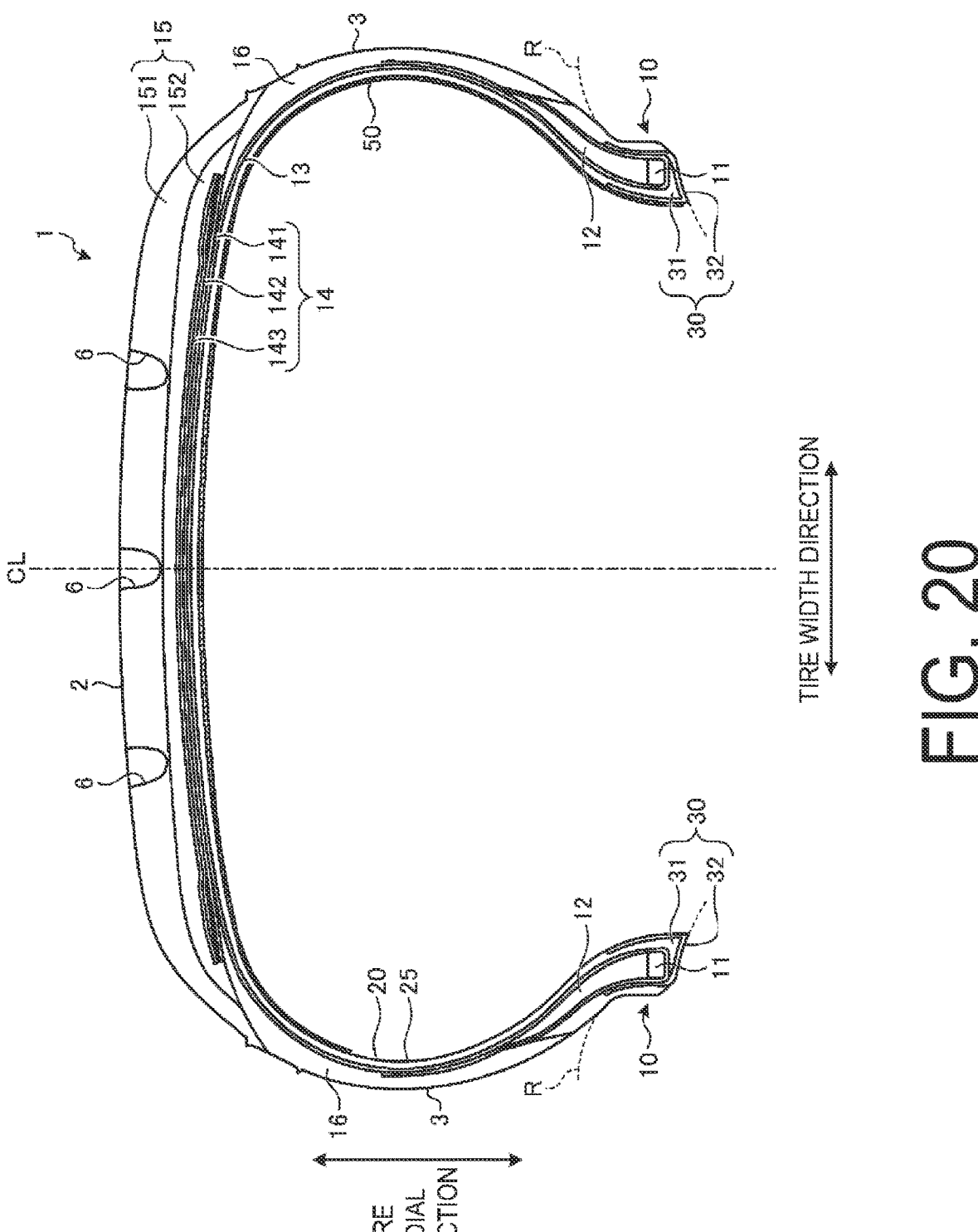
FIG. 20 is a modified example of a pneumatic tire according to an embodiment and is an explanatory diagram in a case where a linear conductive portion is disposed over a tire equatorial plane in a tire width direction.

Although the linear conductive portion 50 is disposed without extending over the tire equatorial plane CL in the tire width direction in the embodiments described above, the linear conductive portion 50 may be disposed over the tire equatorial plane CL in the tire width direction. FIGS. 19 and 20 are each a modified example of a pneumatic tire 1 according to an embodiment and is an explanatory diagram in a case where a linear conductive portion 50 is disposed over a tire equatorial plane CL in a tire width direction. For example, the linear conductive portion 50 may be disposed over the tire equatorial plane CL in the tire width direction as illustrated in FIGS. 19 and 20. In this case, an end portion of the linear conductive portion 50 on the outer side in the tire radial direction may be positioned on the inner side of the belt layer 14 in the tire radial direction as illustrated in FIG. 19. Alternatively, as illustrated in FIG. 20, the linear conductive portion 50 disposed over the tire equatorial plane CL in the tire width direction may extend beyond the region where the belt layer 14 is disposed in the tire width direction to a sidewall portion 3 on a side opposite to the sidewall portion 3 side where the linear conductive portion 50 is disposed.

Figure 21:
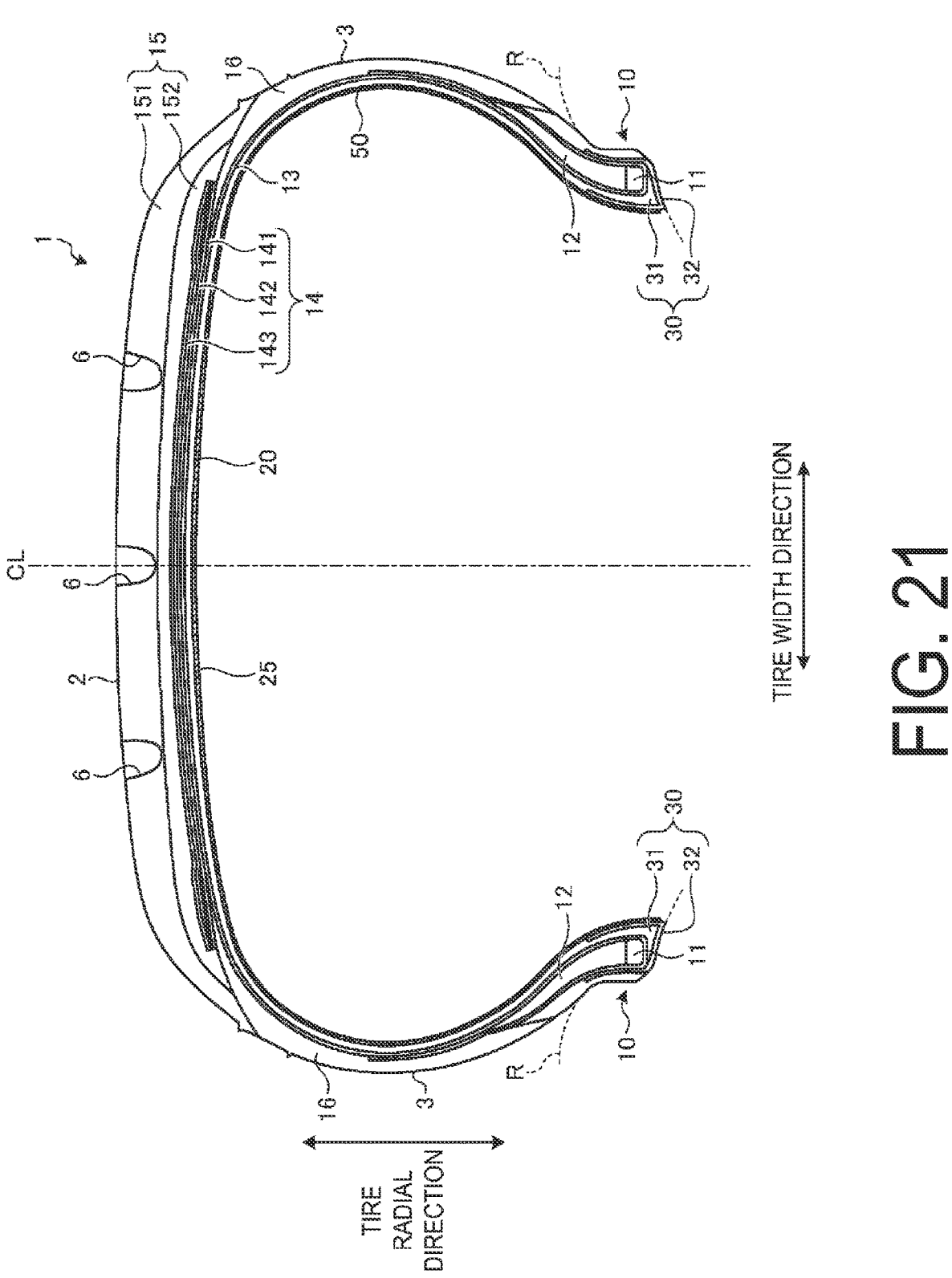
FIG. 21 is a modified example of a pneumatic tire according to an embodiment and is an explanatory diagram in a case where a linear conductive portion is disposed extending to both sides in a tire width direction.

Furthermore, although the linear conductive portion 50 is disposed on one side of the tire equatorial plane CL in the tire width direction in the embodiments described above, the linear conductive portion 50 may be disposed on both sides of the tire equatorial plane CL in the tire width direction. FIG. 21 is a modified example of a pneumatic tire 1 according to an embodiment and is an explanatory diagram in a case where a linear conductive portion 50 is disposed extending to both sides in a tire width direction. For example, the linear conductive portion 50 may be disposed on both sides in the tire width direction as illustrated in FIG. 21. That is, the linear conductive portion 50 may be continuously disposed from one bead portion 10 side to the other bead portion 10 sides for the bead portions 10 positioned on both sides of in the tire width direction.

Figure 22:
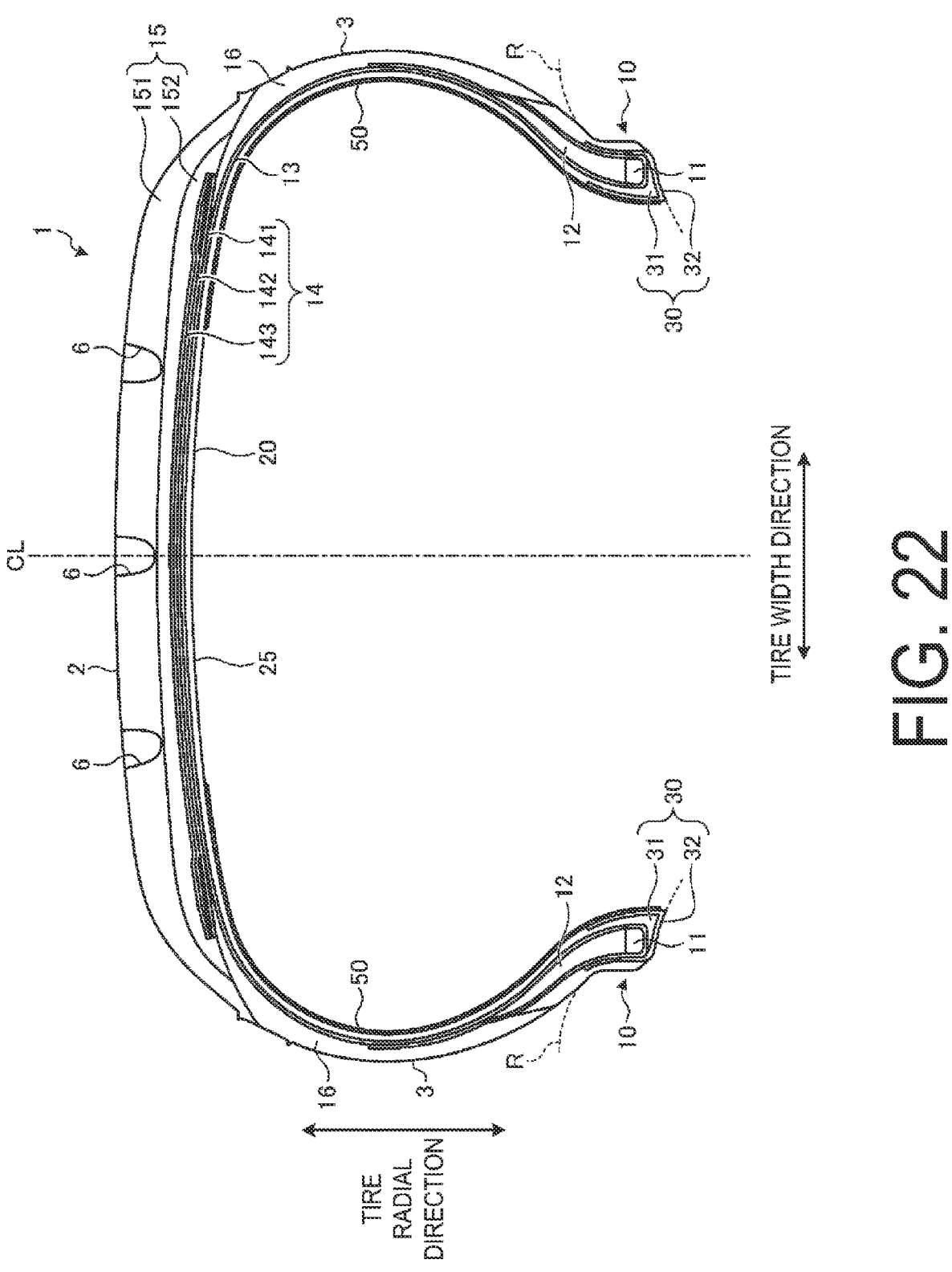
FIG. 22 is a modified example of a pneumatic tire according to an embodiment and is an explanatory diagram in a case where linear conductive portions are disposed on both sides in a tire width direction.

FIG. 22 is a modified example of a pneumatic tire 1 according to an embodiment and is an explanatory diagram in a case where a linear conductive portion 50 is disposed extending to both sides in a tire width direction. Furthermore, as illustrated in FIG. 22, the linear conductive portions 50 may be disposed, each independently, extending from a position in the bead portion 10 to a position in the belt layer 14 in regions on both sides of the tire equatorial plane CL in the tire width direction. In this case, the lap widths La (see FIG. 3) of the linear conductive portions 50 with respect to the belt layer 14 may be an identical size for the linear conductive portions 50 disposed on both sides in the tire width direction or may be sizes that are different each other.

Figure 23:
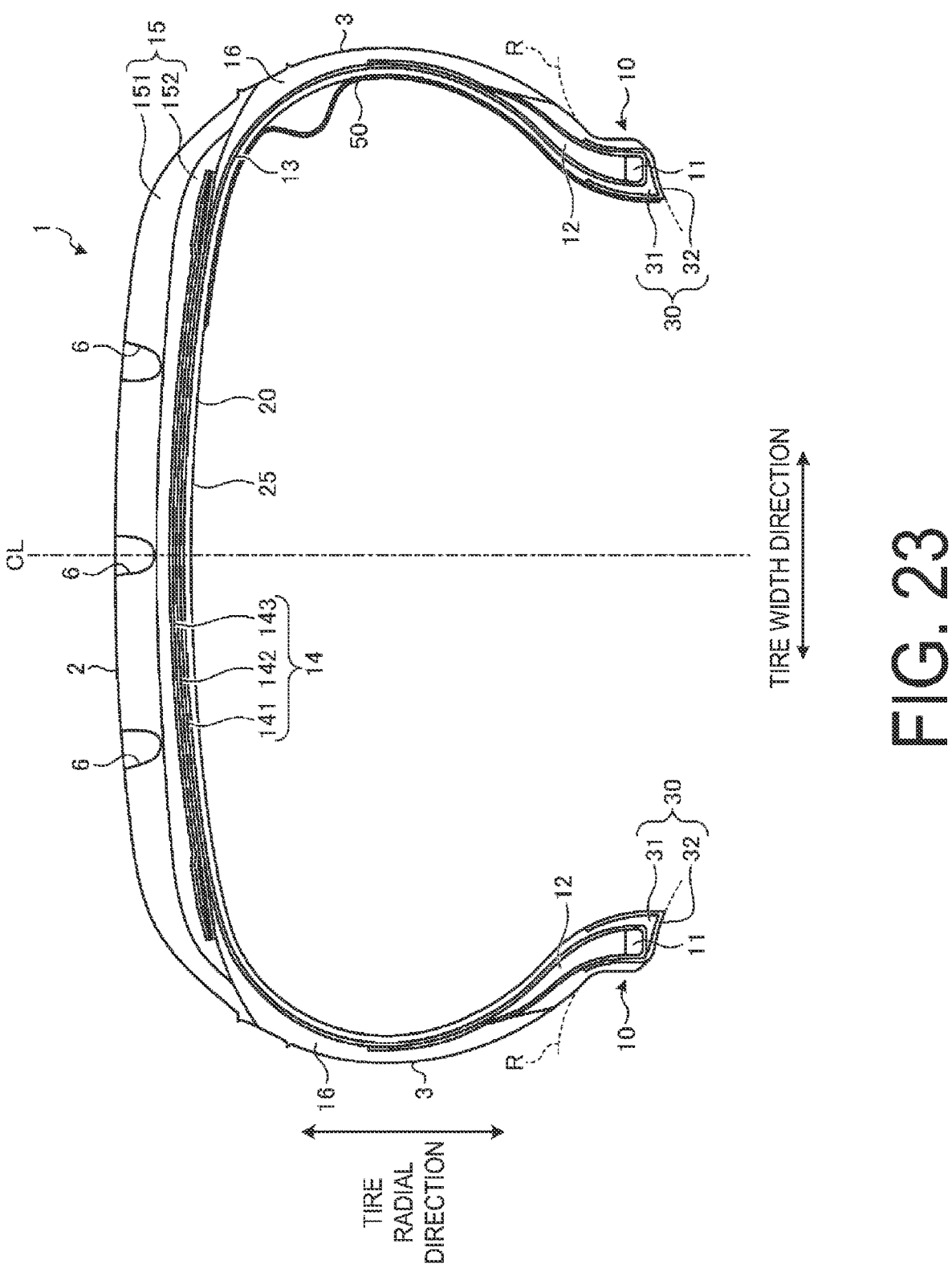
FIG. 23 is a modified example of a pneumatic tire according to an embodiment and is an explanatory diagram of a linear conductive portion having a portion disposed separated from a tire inner surface.

In the embodiments described above, the linear conductive portion 50 is disposed on the tire inner surface rubber layer 20 along the tire inner surface 25; however, the linear conductive portion 50 may include a portion that is not disposed on the tire inner surface rubber layer 20. FIG. 23 is a modified example of a pneumatic tire 1 according to an embodiment and is an explanatory diagram of a linear conductive portion 50 having a portion disposed separated from a tire inner surface 25. The linear conductive portion 50 disposed on the tire inner surface rubber layer 20 may be disposed, for example, in a manner that a part of the linear conductive portion 50 is separated from the tire inner surface 25 in the tire inner cavity side as illustrated in FIG. 23. The entire portion of the linear conductive portion 50 is not required to be disposed in contact with the tire inner surface rubber layer 20 or the bead portion rubber 30, and the linear conductive portion 50 may be disposed partially separated from the tire inner surface 25 in the tire inner cavity side.

Figure 24:
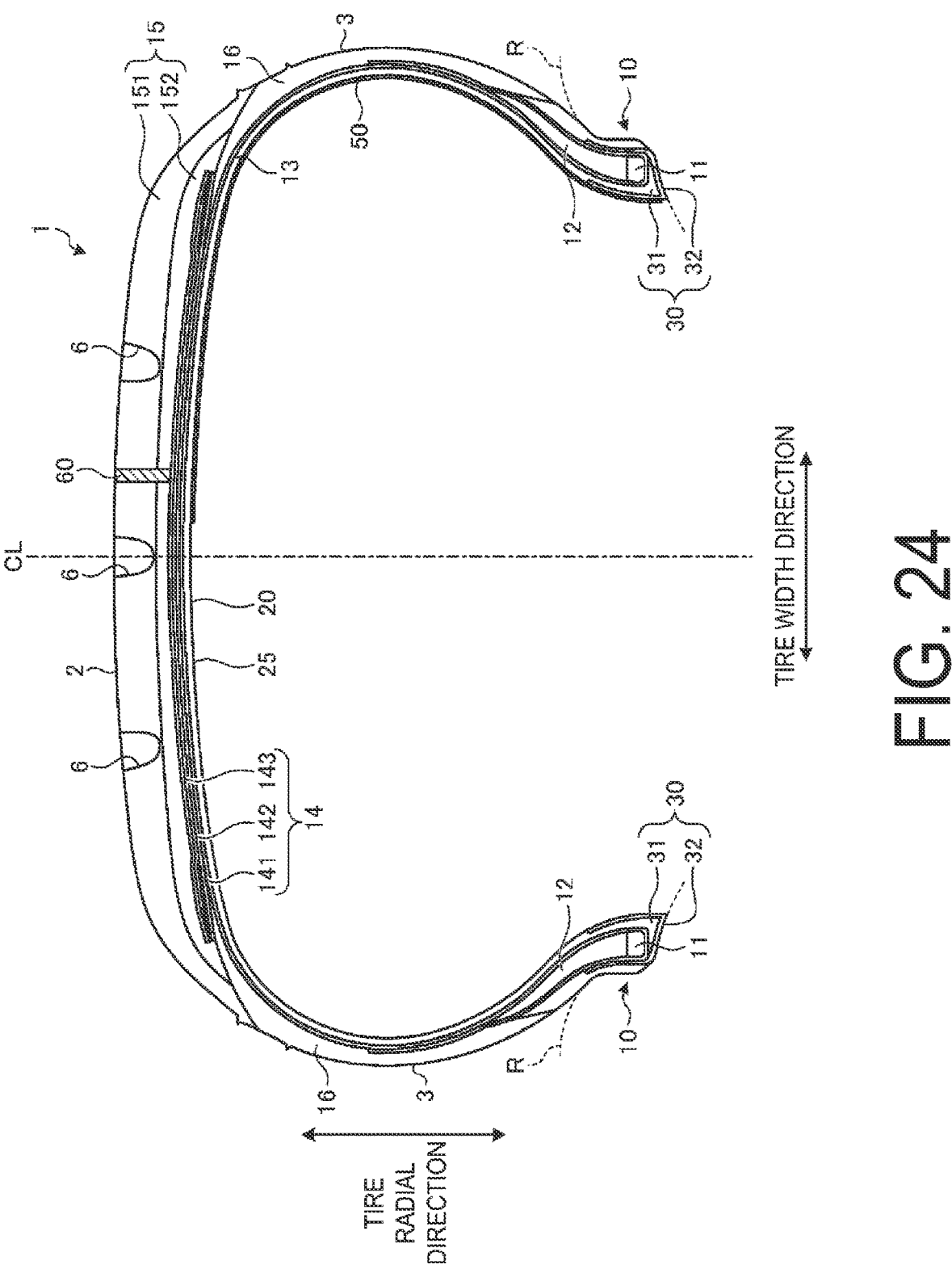
FIG. 24 is a modified example of a pneumatic tire according to an embodiment and is an explanatory diagram in a case where an earthing tread is disposed.

In the embodiment described above, although the linear conductive portion 50 is used as the electrostatic suppressing structure to discharge static electricity generated in a vehicle during traveling of the vehicle to a road surface, the electrostatic suppressing structure may include an additional member besides the linear conductive portion 50. FIG. 24 is a modified example of a pneumatic tire 1 according to an embodiment and is an explanatory diagram in a case where an earthing tread 60 is disposed. For example, the earthing tread 60 may be used in the electrostatic suppressing structure to discharge static electricity generated in a vehicle to a road surface as illustrated in FIG. 24. The earthing tread 60 in this case is a conductive rubber embedded in the tread rubber 15 and exposed to the tire ground contact surface. In the electrostatic suppressing structure including the linear conductive portion 50 and the earthing tread 60, static electricity from the vehicle allowed to flow to the belt layer 14 by the linear conductive portion 50 is discharged from the belt layer 14 to the road surface via the earthing tread 60, and thus electrostatic charging in the vehicle is suppressed.

For details, the earthing tread 60 is exposed to the road contact surface of the tread rubber 15, is disposed passing through the cap tread 151 and the undertread 152, and is in contact with the belt layer 14 in a conductive manner. That is, the earthing tread 60 is at least disposed passing through the cap tread 151 and exposed to the tire ground contact surface. In the modified example illustrated in FIG. 24, the earthing tread 60 is disposed passing through the cap tread 151 and the undertread 152, and an end portion on the inner side in the tire radial direction is in contact with the belt cover 143 in a conductive manner. Consequently, a conductive path is secured from the belt layer 14 to the road surface.

In addition, the earthing tread 60 has an annular structure extending around the entire circumference of the tire. A portion of the earthing tread 60 is exposed to the tread contact surface and extends continuously in the tire circumferential direction. Thus, when the pneumatic tire 1 is driven, a conductive path from the belt layer 14 to the road surface is always ensured by the earthing tread 60 being always in contact with the road surface. In the modified example illustrated in FIG. 24, the width of the earthing tread 60 in the tire width direction is narrower than the groove width of the circumferential main groove 6 extending in the tire circumferential direction on the tread portion 2, and the earthing tread 60 is formed between circumferential main grooves 6 that are adjacent in the tire width direction.

The earthing tread 60 is made of conductive rubber material having a lower volume resistivity than the tread rubber 15. Specifically, the earthing tread 60 preferably has a volume resistivity of less than $1 \times 10^{8}$ $\Omega \cdot$cm, and more preferably of $1 \times 10^{6}$ $\Omega \cdot$cm or less.

Configuring the electrostatic suppressing structure using the earthing tread 60 in addition to the linear conductive portion 50 as described above allows a path from the rim R through the bead portion rubber 30, the linear conductive portion 50, and the belt layer 14 to the earthing tread 60 to be used as a conductive path to discharge static electricity from a vehicle to a road surface. In other words, since the earthing tread 60 is at least disposed passing through the cap tread 151 and exposed to the tire ground contact surface as well as having a volume resistivity of less than $1 \times 10^{8}$ $\Omega \cdot$cm, a conductive path from the belt layer 14 side to a road surface can be ensured by the earthing tread 60. Accordingly, the conductive path from the linear conductive portion 50 to the road surface can be ensured, and thus the conductive path from the rim R to the earthing tread 60 can be more reliably ensured. Thus, the electrical resistance between the rim R and the road surface can be more reliably reduced, and static electricity generated in the vehicle can be more reliably discharged to the road surface. As a result, the electrostatic suppression performance can be more reliably ensured.

By providing the earthing tread 60, degradation in the electrostatic suppression performance can be suppressed in a case where a silica content in a rubber compound constituting the cap tread 151, the undertread 152, the sidewall rubber 16, or the like is increased to improve fuel efficiency by reducing rolling resistance of the pneumatic tire 1. In other words, since silica has high insulating characteristics, when the silica content of the cap tread 151 is increased, a volume resistance value of the cap tread 151 increases and the electrostatic suppression performance decreases; however, by providing the earthing tread 60, the conductive path between the belt layer 14 and a road surface can be ensured. As a result, the electrostatic suppression performance can be ensured in a case where rolling resistance is reduced.

EXAMPLES

FIGS. 25A and 25B are tables showing results of performance evaluation tests of pneumatic tires. Hereinafter, evaluation tests of performance of the pneumatic tire 1 described above performed on pneumatic tires of Conventional Examples and the pneumatic tires 1 according to the embodiments of the present technology will be described. The performance evaluation tests were performed for electrical resistances in new condition and after travel of the pneumatic tire 1.

The performance evaluation tests were performed by using the pneumatic tire having a tire nominal size of 195/65R15 91H specified by JATMA as a test tire. The evaluation test for electrical resistance of the test tire in new condition was performed by measuring electrical resistance [Ω] of the test tire by using R8340A ultra high resistance meter, available from Advantest Corporation, in accordance with measurement conditions specified by JATMA.

The evaluation test for electrical resistance of the test tire after travel was measured as follows:

the test tires were mounted on applicable rims as specified by JATMA, inflated to an air pressure of 200 kPa, loaded with 80% of a maximum load as specified by JATMA, and run for 60 minutes at a speed of 81 km/h using an indoor drum type tire rolling resistance tester with a drum diameter of 1707 mm, and then the electrical resistance [Ω] of the test tire was measured by using R8340A ultra high resistance meter, available from Advantest Corporation, in accordance with measurement conditions specified by JATMA. A smaller measured value of the tire electrical resistance in new condition or after travel indicates lower electrical resistance and superior performance of tire electrical resistance.

The performance evaluation tests were performed on 15 types of pneumatic tires including a pneumatic tire according to Conventional Example as an example of a known pneumatic tire, and Examples 1 to 14 corresponding to the pneumatic tires 1 according to embodiments of the present technology. Among these, in the pneumatic tire of Conventional Example, the linear conductive portion is disposed on a surface of the carcass.

In contrast, in Examples 1 to 14 that are each an example of the pneumatic tires 1 according to embodiments of the present technology, all the linear conductive portions are disposed on the tire inner surfaces. In the pneumatic tire 1 according to Examples 1 to 14, the relationship (La/Lbp) between the width Lbp of the belt layer 14 in the periphery direction and the lap width La of the linear conductive portion 50 with respect to the belt layer 14, the volume resistivity of the bead portion rubber 30, the relationship (Lbc/Lbg) between the surface length Lbg of the bead portion rubber 30 in the periphery direction and the length Lbc of the portion of the linear conductive portion 50 overlapping the bead portion rubber 30, the relationship (f/t) between the embedded amount f of the linear conductive portion 50 into the tire inner surface rubber layer 20 and the thickness t of the tire inner surface rubber layer 20, the relationship (L2/L1) between the length L1 of the linear conductive portion 50 in the periphery direction and the total length L2 of the linear conductive portion 50, the relationships (Lra/La, Lrb/Lb, Lrc/Lc) between a distance in the periphery direction in a position where the linear conductive portion 50 is disposed and an actual length thereof, presence of overlapping of the linear conductive portion 50, the total fineness of the linear conductive portion 50, the elongation ratio of the linear conductive portion 50, and presence of the cover rubber layer 23 are varied.

As a result of performing the evaluation test using these pneumatic tires 1, as shown in FIGS. 25A and 25B, it was found that the pneumatic tires 1 according to Examples 1 to 14 can reduce tire electrical resistance after travel compared to Conventional Example. Thus, it was found that the pneumatic tire 1 according to each of Examples 1 to 14 can prevent excessive increase of the tire electrical resistance after travel with respect to the tire electrical resistance in new condition compared to Conventional Example and change in the tire electrical resistances between the new condition and after travel is not large. In other words, the pneumatic tire 1 according to each of Examples 1 to 14 has the effect of maintaining tire electrical resistance after travel.

The invention claimed is:

1. A tire, comprising:

a pair of bead portions, each including a bead core;

at least one carcass layer extending between the pair of bead portions;

a belt layer disposed on an outer side of the at least one carcass layer in a tire radial direction; and a tire inner surface rubber layer constituting a tire inner surface;

the tire further comprising a linear conductive portion extending continuously at least from one of the bead portions to the belt layer and disposed on the tire inner surface rubber layer; and the linear conductive portion being at least partially exposed to a tire inner cavity side and having a volume resistivity of less than $1 \times 10^{\wedge}8$ Ω·cm; wherein the linear conductive portion satisfies a relationship between a distance Lc in a periphery direction of a portion of the linear conductive portion positioned between an edge of the belt layer and the one of the bead portions and an actual length Lrc of a portion of the linear conductive portion positioned between the edge of the belt layer and the one of the bead portions of $1.0 < Lrc/Lc < 3.0$, satisfies a relationship between a distance La in the periphery direction of a portion of the linear conductive portion overlapping the belt layer and an actual length Lra of a portion of the linear conductive portion overlapping the belt layer of $Lrc/Lc < Lra/La < 8.0$, and satisfies a relationship between a distance Lb in the periphery direction of a portion of the linear conductive portion positioned in the one of the bead portions and an actual length Lrb of a portion of the linear conductive portion positioned in the one of the bead portions of $Lrc/Lc < Lrb/Lb < 8.0$.

2. The tire according to claim 1, wherein the belt layer comprises one or more belt plies extending in a tire width direction, in drawing perpendicular lines from end portions on both sides in the tire width direction of a belt ply having a largest width in the tire width direction of the belt plies toward the tire inner surface, a periphery length between intersection points of the perpendicular lines and the tire inner surface in Lbp, and the linear conductive portion satisfies $0.01 \leq La/Lbp \leq 1$.

3. The tire according to claim 1, wherein a bead portion rubber in contact with a rim flange is disposed in the one of the bead portions, the bead portion rubber has a volume resistivity of less than $1 \times 10^{\wedge}8$ Ω·cm, and the linear conductive portion satisfies a relationship between a surface length Lbg of the bead portion rubber in the periphery direction and a length Lbc of a portion of the linear conductive portion overlapping the bead portion rubber of $0.01 \leq Lbc/Lbg \leq 1.00$.

4. The tire according to claim 1, wherein the linear conductive portion extends from the tire inner surface side to at least a bead base beyond a bead toe of the one of the bead portions.

5. The tire according to claim 1, wherein an embedded amount of the linear conductive portion from the tire inner surface side into the tire inner surface rubber layer is f, a thickness of the tire inner surface rubber layer is t, and the linear conductive portion has the embedded amount f in a region having a largest embedded amount f into the tire inner surface rubber layer satisfying $f/t < 0.5$.

6. The tire according to claim 1, wherein the linear conductive portion has a relationship between a length L1 of the linear conductive portion in the periphery direction and a total length L2 of the linear conductive portion satisfying $1 < L2/L1 < 5$.

7. The tire according to claim 1, wherein a plurality of the linear conductive portions is disposed, and the plurality of the linear conductive portions is disposed without overlapping each other.

8. The tire according to claim 1, further comprising a cover rubber layer provided on the tire inner cavity side of the linear conductive portion and covering part of the linear conductive portion.

9. The tire according to claim 1, wherein the linear conductive portion is made by intertwining a plurality of linear members including at least one conductive linear member having a volume resistivity of less than $1 \times 10^{8}$ $\Omega \cdot cm$.

10. The tire according to claim 9, wherein the linear conductive portion is made by intertwining the at least one conductive linear member and a non-conductive linear member having a volume resistivity of $1 \times 10^{8}$ $\Omega \cdot cm$ or more.

11. The tire according to claim 10, wherein the at least one conductive linear member is a metal fiber, and the non-conductive linear member is an organic fiber.

12. The tire according to claim 9, wherein the conductive linear member is made by intertwining a plurality of carbon fibers.

13. The tire according to claim 9, wherein the conductive linear member is a monofilament cord made of a carbon fiber.

14. The tire according to claim 1, wherein the linear conductive portion has a total fineness of 20 dtex or more and 1000 dtex or less.

15. The tire according to claim 14, wherein the linear conductive portion has an elongation ratio of 1.0% or more and 70.0% or less.

* * * * *